(12) United States Patent
Li et al.

(10) Patent No.: US 10,952,100 B2
(45) Date of Patent: Mar. 16, 2021

(54) UL SCHEDULING TIMING WITH SHORT TTIS IN TDD

(71) Applicant: Telefonaktiebolaget LM Ericsson (publ), Stockholm (SE)

(72) Inventors: Jingya Li, Gothenburg (SE); Laetitia Falconetti, Järfälla (SE); Daniel Larsson, Lund (SE); Henrik Sahlin, Mölnlycke (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/323,605

(22) PCT Filed: Aug. 10, 2017

(86) PCT No.: PCT/IB2017/054893
§ 371 (c)(1),
(2) Date: Feb. 6, 2019

(87) PCT Pub. No.: WO2018/029636
PCT Pub. Date: Feb. 15, 2018

(65) Prior Publication Data
US 2019/0174354 A1 Jun. 6, 2019

Related U.S. Application Data

(60) Provisional application No. 62/374,390, filed on Aug. 12, 2016.

(51) Int. Cl.
*H04W 28/08* (2009.01)
*H04L 5/14* (2006.01)
*H04W 72/04* (2009.01)
*H04W 72/14* (2009.01)
*H04W 72/12* (2009.01)

(52) U.S. Cl.
CPC ......... *H04W 28/085* (2013.01); *H04L 5/1469* (2013.01); *H04W 72/0446* (2013.01);
(Continued)

(58) Field of Classification Search
CPC ... H04W 2/085; H04W 2/0268; H04W 72/02; H04W 72/04; H04W 72/0446;
(Continued)

(56) References Cited

U.S. PATENT DOCUMENTS

2009/0181689 A1   7/2009 Lee et al.
2010/0182939 A1   6/2010 Ojala et al.
(Continued)

FOREIGN PATENT DOCUMENTS

EP   3043502 A1   7/2016
EP   3076734 A1   10/2016
(Continued)

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.0.0, 3GPP Organizational Partners, Dec. 2015, 141 pages.
(Continued)

*Primary Examiner* — Candal Elpenord
(74) *Attorney, Agent, or Firm* — Withrow & Terranova, PLLC

(57) ABSTRACT

Systems and methods for determining and utilizing an uplink scheduling timing when using short Transmission Time Intervals (sTTIs) are disclosed. In some embodiments, a method of operation of a wireless device in a cellular communications network comprises receiving an uplink grant in sTTI n; determining, based on a configured uplink/downlink configuration, an uplink scheduling timing I; and
(Continued)

transmitting, in a sTTI n+I, an uplink transmission in accordance with the uplink grant received in the sTTI n. In this manner, an uplink timing is determined and utilized when using sTTIs.

26 Claims, 22 Drawing Sheets

(52) U.S. Cl.
CPC ....... *H04W 72/1252* (2013.01); *H04W 72/14* (2013.01); *H04W 72/0413* (2013.01); *H04W 72/0486* (2013.01)

(58) Field of Classification Search
CPC ............. H04W 72/1252; H04W 72/14; H04W 28/085; H04W 28/0268; H04W 72/0486; H04W 72/0413; H04L 5/1469
See application file for complete search history.

(56) References Cited

U.S. PATENT DOCUMENTS

| | | | |
|---|---|---|---|
| 2013/0223298 | A1 | 8/2013 | Ahn et al. |
| 2013/0272169 | A1 | 10/2013 | Wang et al. |
| 2013/0301490 | A1 | 11/2013 | He et al. |
| 2014/0029490 | A1 | 1/2014 | Kim et al. |
| 2014/0092789 | A1 | 4/2014 | Lei et al. |
| 2014/0092794 | A1 | 4/2014 | Yang et al. |
| 2014/0112217 | A1 | 4/2014 | Ahn et al. |
| 2014/0269451 | A1 | 9/2014 | Papasakellariou et al. |
| 2014/0293843 | A1 | 10/2014 | Papasakellariou et al. |
| 2015/0208407 | A1 | 7/2015 | Yang et al. |
| 2015/0244485 | A1 | 8/2015 | Nguyen et al. |
| 2015/0365965 | A1* | 12/2015 | Wu .................. H04L 1/1812 370/328 |
| 2016/0013902 | A1 | 1/2016 | Cui et al. |
| 2016/0020891 | A1 | 1/2016 | Jung et al. |
| 2016/0021659 | A1 | 1/2016 | Yang et al. |
| 2016/0119948 | A1 | 4/2016 | Damnjanovic et al. |
| 2016/0182213 | A1 | 6/2016 | Golitschek Edler von Elbwart et al. |
| 2016/0198461 | A1 | 7/2016 | Su |
| 2016/0360550 | A1* | 12/2016 | Chen .................... H04L 5/0096 |
| 2017/0223702 | A1 | 8/2017 | Yin et al. |
| 2017/0332365 | A1* | 11/2017 | Lin .................. H04W 72/0406 |
| 2017/0332386 | A1* | 11/2017 | Li ...................... H04L 1/1812 |
| 2018/0359068 | A1 | 12/2018 | Kim et al. |
| 2018/0376497 | A1* | 12/2018 | You ...................... H04L 1/00 |
| 2019/0068334 | A1 | 2/2019 | Stern-Berkowitz et al. |
| 2019/0104520 | A1* | 4/2019 | Kim .................. H04W 48/12 |
| 2019/0150171 | A1 | 5/2019 | Hwang et al. |
| 2019/0191434 | A1* | 6/2019 | Hugl ................ H04W 72/0446 |
| 2019/0223204 | A1 | 7/2019 | Kim et al. |

FOREIGN PATENT DOCUMENTS

| | | | |
|---|---|---|---|
| WO | 2012171553 | A1 | 12/2012 |
| WO | 2014089107 | A1 | 6/2014 |
| WO | 2015079926 | A1 | 6/2015 |
| WO | 2015100136 | A1 | 7/2015 |
| WO | 2018029634 | A1 | 2/2018 |
| WO | 2018029637 | A1 | 2/2018 |

OTHER PUBLICATIONS

Author Unknown, "Technical Specification Group Radio Access Network; Evolved Universal Terrestrial Radio Access (E-UTRA); Physical layer procedures (Release 13)," Technical Specification 36.213, Version 13.0.1, 3GPP Organizational Partners, Jan. 2016, 326 pages.
CMCC, "R1-164884: Discussion on PUSCH transmission for UpPTS," Third Generation Partnership Project (3GPP), TSG RAN WG1 Meeting #85, May 23-27, 2016, 3 pages, Nanjing, China.
CMCC, "R1-164885: Discussion on latency reduction for TDD," Third Generation Partnership Project (3GPP), TSG RAN WG1 Meeting #85, May 23-27, 2016, 3 pages, Nanjing, China.
Ericsson, "R1-163326: On processing time reduction and related procedures," Third Generation Partnership Project (3GPP), TSG RAN WG1 Meeting #84 bis, Apr. 11-15, 2016, 6 pages, Busan.
Ericsson, "R1-167495: TDD aspects of short TTI," Third Generation Partnership Project (3GPP), TSG-RAN WG1 #86, Aug. 22-26, 2016, 3 pages, Goteborg, Sweden.
Ericsson, "R1-167501: Supported HARQ timings for 1ms TTI and reduced processing time," Third Generation Partnership Project (3GPP), TSG-RAN WG1 #86, Aug. 22-26, 2016, 3 pages, Goteborg, Sweden.
Ericsson, "R1-1708868: FS2 aspects of short TTI," Third Generation Partnership Project (3GPP), TSG-RAN WG1 Meeting #89, May 15-19, 2017, 5 pages, Hangzhou, P.R. China.
Huawei, et al., "R1-162115: Short TTI for UL transmissions," Third Generation Partnership Project (3GPP), TSG RAN WG1 Meeting #84bis, Apr. 11-15, 2016, 4 pages, Busan, Korea.
Nokia Networks, "R1-157292: On Shorter TTI for Latency Reduction," Third Generation Partnership Project (3GPP), TSG-RAN WG1 Meeting #83, Nov. 15-22, 2015, 4 pages, Anaheim, USA.
Samsung, "R1-156822: Study on specification impact for uplink due to TTI shortening," Third Generation Partnership Project (3GPP), TSG RAN WG1 #83, Nov. 15-22, 2015, 3 pages, Anaheim, USA.
International Search Report and Written Opinion for International Patent Application No. PCT/IB2017/054891, dated Nov. 10, 2017, 19 pages.
Written Opinion for International Patent Application No. PCT/IB2017/054891, dated Jul. 16, 2018, 6 pages.
International Preliminary Report on Patentability for International Patent Application No. PCT/IB2017/054891, dated Nov. 6, 2018, 10 pages.
International Search Report and Written Opinion for International Patent Application No. PCT/IB2017/054893, dated Dec. 1, 2017, 21 pages.
Written Opinion for International Patent Application No. PCT/IB2017/054893, dated Jul. 4, 2018, 10 pages.
International Preliminary Report on Patentability for International Patent Application No. PCT/IB2017/054893, dated Nov. 9, 2018, 9 pages.
International Search Report and Written Opinion for International Patent Application No. PCT/IB2017/054894, dated Nov. 16, 2017, 18 pages.
Written Opinion for International Patent Application No. PCT/IB2017/054894, dated Jul. 13, 2018, 6 pages.
International Preliminary Report on Patentability for International Patent Application No. PCT/IB2017/054894, dated Nov. 19, 2018, 33 pages.
Intention to Grant for European Patent Application No. 17768232.5, dated May 11, 2020, 111 pages.
Intention to Grant for European Patent Application No. 17767927.1, dated May 27, 2020, 115 pages.
Non-Final Office Action for U.S. Appl. No. 16/323,590, dated May 14, 2020, 17 pages.
Non-Final Office Action for U.S. Appl. No. 16/323,617, dated Feb. 24, 2020, 21 pages.
Notice of Allowance for U.S. Appl. No. 16/323,617, dated Aug. 5, 2020, 10 pages.
Final Office Action for U.S. Appl. No. 16/323,590, dated Nov. 9, 2020, 17 pages.

* cited by examiner

UL SCHEDULING TIMING FOR TDD DL/UL CONFIGURATION 1, UpPTS IS NOT USED FOR UL DATA TRANSMISSION

UL SCHEDULING TIMING FOR TDD DL/UL CONFIGURATION 1, UpPTS IS USED FOR UL DATA TRANSMISSION

UL SCHEDULING TIMING FOR TDD DL/UL CONFIGURATION 2, UpPTS IS NOT USED FOR UL DATA TRANSMISSION

UL SCHEDULING TIMING FOR TDD DL/UL CONFIGURATION 2, UpPTS IS USED FOR UL DATA TRANSMISSION

UL SCHEDULING TIMING FOR TDD DL/UL CONFIGURATION 3, UpPTS IS NOT USED FOR UL DATA TRANSMISSION

UL SCHEDULING TIMING FOR TDD DL/UL CONFIGURATION 3, UpPTS IS USED FOR UL DATA TRANSMISSION

UL SCHEDULING TIMING FOR TDD DL/UL CONFIGURATION 4, UpPTS IS NOT USED FOR UL DATA TRANSMISSION

UL SCHEDULING TIMING FOR TDD DL/UL CONFIGURATION 4, UpPTS IS USED FOR UL DATA TRANSMISSION

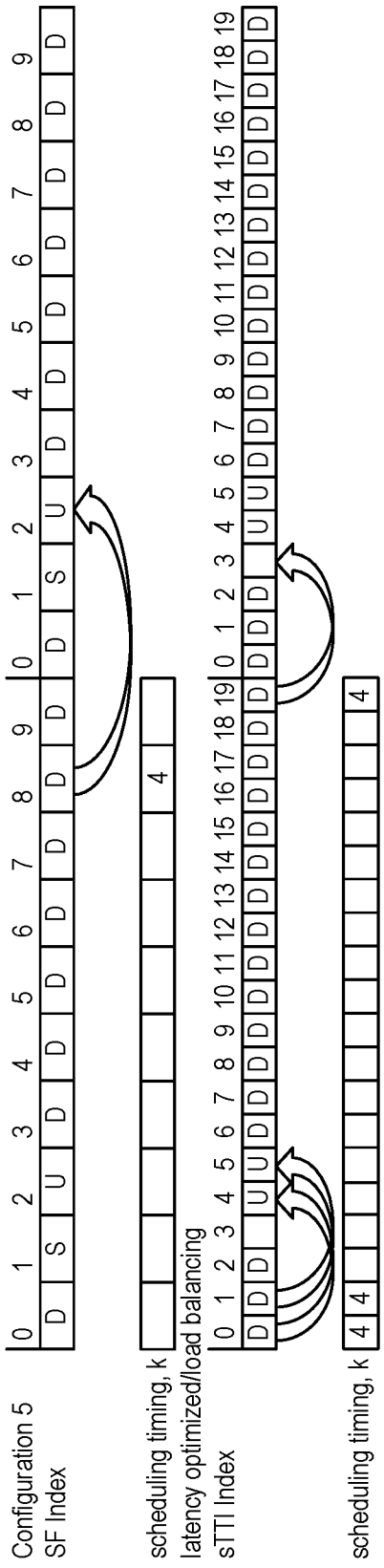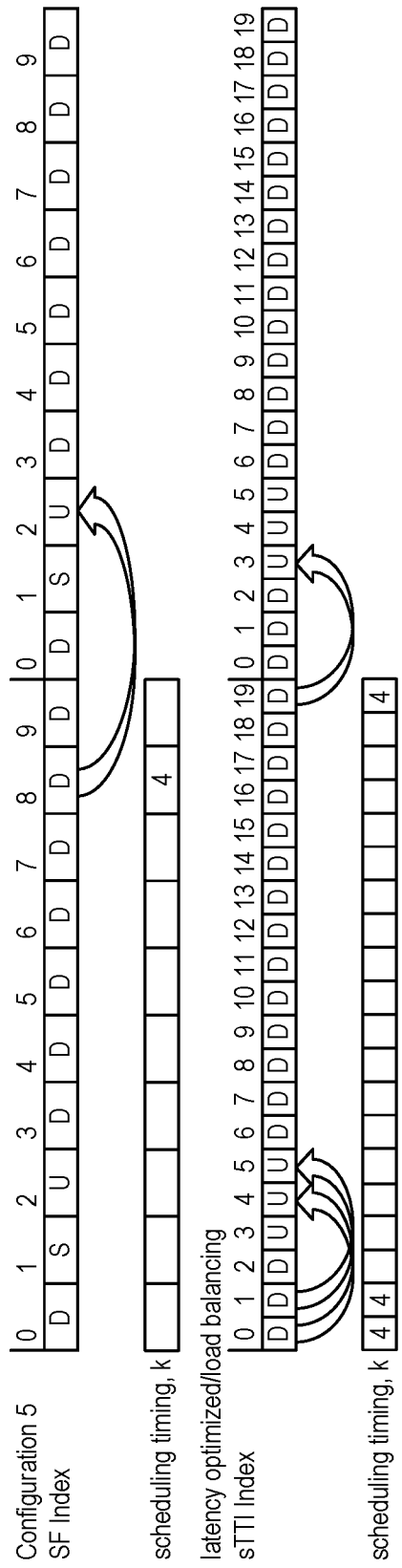
FIG. 11
UL SCHEDULING TIMING FOR TDD DL/UL CONFIGURATION 5, UpPTS IS NOT USED FOR UL DATA TRANSMISSION
FIG. 12
UL SCHEDULING TIMING FOR TDD DL/UL CONFIGURATION 5, UpPTS IS USED FOR UL DATA TRANSMISSION

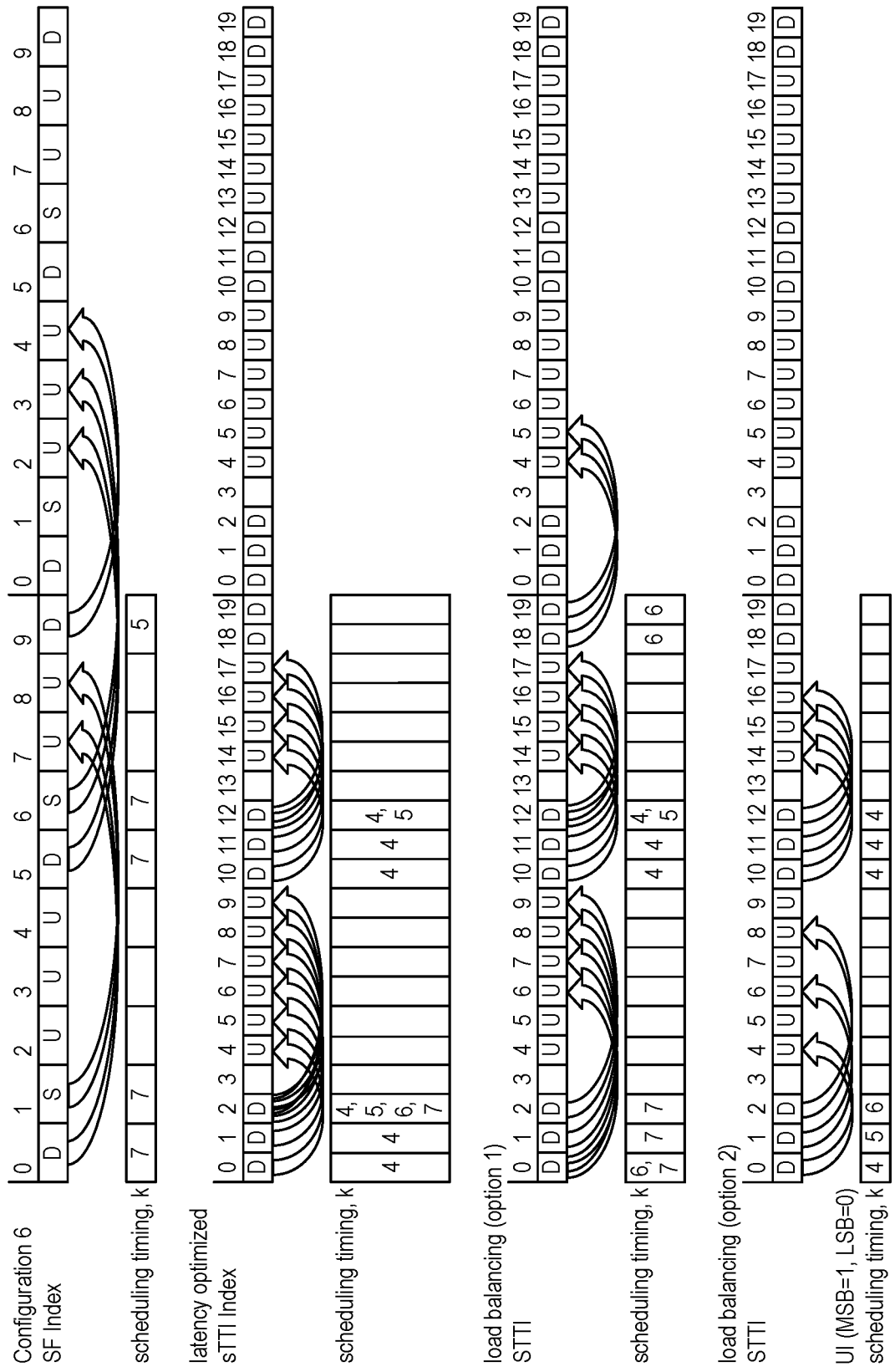
FIG. 13A UL SCHEDULING TIMING FOR TDD DL/UL CONFIGURATION 6, UpPTS IS NOT USED FOR UL DATA TRANSMISSION UL SCHEDULING TIMING FOR TDD DL/UL CONFIGURATION 6, UpPTS IS NOT USED FOR UL DATA TRANSMISSION UL SCHEDULING TIMING FOR TDD DL/UL CONFIGURATION 6, UpPTS IS USED FOR UL DATA TRANSMISSION UL SCHEDULING TIMING FOR TDD DL/UL CONFIGURATION 6, UpPTS IS USED FOR UL DATA TRANSMISSION

FIG. 15

UL SCHEDULING TIMING FOR TDD DL/UL CONFIGURATION 6, UpPTS IS USED FOR UL DATA TRANSMISSION. THE TIMING FOR UpPTS IS ADDED ON TOP OF THE TIMING RELATIONS SHOWN IN FIGURES 13A AND 13B

UL SCHEDULING TIMING FOR TDD DL/UL CONFIGURATION 0, UpPTS IS NOT USED FOR UL DATA TRANSMISSION

FIG. 16B

UL SCHEDULING TIMING FOR TDD DL/UL CONFIGURATION 0, UpPTS IS NOT USED FOR UL DATA TRANSMISSION

UL SCHEDULING TIMING FOR TDD DL/UL CONFIGURATION 0, UpPTS IS USED FOR UL DATA TRANSMISSION

UL SCHEDULING TIMING FOR TDD DL/UL CONFIGURATION 0, UpPTS IS USED FOR UL DATA TRANSMISSION

UL SCHEDULING TIMING WITH SHORT TTIS IN TDD

RELATED APPLICATIONS

This application is a 35 U.S.C. § 371 national phase filing of International Application No. PCT/IB2017/054893, filed Aug. 10, 2017, which claims the benefit of provisional patent application Ser. No. 62/374,390, filed Aug. 12, 2016, the disclosures of which are hereby incorporated herein by reference in their entireties.

TECHNICAL FIELD

The present disclosure relates to uplink scheduling timing in a Time Division Duplexing (TDD) system.

BACKGROUND

In Third Generation Partnership Project (3GPP) Technical Specification (TS) 36.211, three radio frame structures are supported. Frame Structure (FS) type 1 (FS 1) is applicable to Frequency Division Duplexing (FDD) only, FS type 2 (FS 2) is applicable to Time Division Duplexing (TDD) only, and FS type 3 (FS 3) is applicable to License Assisted Access (LAA) secondary cell operation only.

With FS 2 for TDD, each radio frame of length 10 milliseconds (ms) consists of two half-frames of length 5 ms each. Each half-frame consists of five Subframes (SFs) of length 1 ms. Each SF is defined by two slots of length 0.5 ms each. Within each radio frame, a subset of SFs are reserved for uplink transmissions, and the remaining SFs are allocated for downlink transmissions, or for special SFs, where the switch between downlink and uplink occurs.

As shown in Table 1, copied from 3GPP TS 36.211 V13.0.0, seven different downlink/uplink configurations are supported for FS 2. Here, "D" denotes a downlink SF, "U" denotes an uplink SF, and "S" represents a special SF. Configurations 0, 1, 2, and 6 have 5 ms downlink-to-uplink switch-point periodicity, where the special SF exists in both SF 1 and SF 6. Configurations 3, 4, and 5 have 10 ms downlink-to-uplink switch-point periodicity, with the special SF in SF 1 only.

TABLE 1

Downlink/Uplink Configurations

| DL/UL config-uration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF is split into three parts: a Downlink Part of a Special Subframe (DwPTS), GP (Guard Period), and an Uplink Part of a Special Subframe (UpPTS). The DwPTS with duration of more than three symbols can be treated as a normal downlink SF for data transmission. However, the UpPTS is not used for data transmission due to the very short duration in the first releases of Long Term Evolution (LTE). Instead, UpPTS can be used for channel sounding or random access. In LTE Release 14 the possibility of using UpPTS for data transmission will be specified for a specific special SF configuration.

Typically, the downlink/uplink configuration and the configuration of the special SF used in a cell are signaled as part of the system information, which is included in System Information Block 1 (SIB1) and broadcasted every 80 ms within SF 5.

Uplink scheduling timing refers to the time relation between a received uplink grant in downlink SF n and the uplink transmission in uplink SF n+l.

In TDD, the value of l depends on the downlink/uplink configuration. For downlink/uplink configurations 1-6, the values of l are given in Table 2, copied from Table 8-2 in 3GPP TS 36.213 V13.0.1.

For downlink/uplink configuration 0, the value of l also depends on the Uplink Index (UI) field of the uplink Downlink Control Information (DCI) transmitted in downlink SF n:

- If the Most Significant Bit (MSB) (i.e., the left-most bit) of the UI is set to 1, the value of l is obtained from Table 2;
- If the Least Significant Bit (LSB) (i.e., the right-most bit) of the UI is set to 1, the value of l is 7;
- If both the MSB and the LSB of the UI are set to 1, the value of l is 7 and the value obtained from Table 2.
- Table 3 gives the uplink scheduling timing table for TDD downlink/uplink configuration 0.

TABLE 2

Uplink Scheduling Timing l for Uplink Retransmissions

| TDD DL/UL configuration | SF index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

TABLE 3

Uplink Scheduling Timing l for TDD Downlink/Uplink Configuration 0

| UL index | DL/special SF | UL timing, l | Scheduled UL SF index |
|---|---|---|---|
| 10 | 0 | 4 | 4 |
| | 1 | 6 | 7 |
| | 5 | 4 | 9 |
| | 6 | 6 | 2 |
| 01 | 0 | 7 | 7 |
| | 1 | 7 | 8 |
| | 5 | 7 | 2 |
| | 6 | 7 | 3 |
| 11 | 0 | 4, 7 | 4, 7 |
| | 1 | 6, 7 | 7, 8 |
| | 5 | 4, 7 | 9, 2 |
| | 6 | 6, 7 | 2, 3 |

Packet data latency is one of the performance metrics that vendors, operators, and also end-users (via speed test applications) regularly measure. Latency measurements are done in all phases of a radio access network system lifetime, when verifying a new software release or system component, when deploying a system, and when the system is in commercial operation.

Shorter latency than previous generations of 3GPP Radio Access Technologies (RATs) was one performance metric that guided the design of LTE. LTE is also now recognized by the end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. According to HTTP Archive (http://httparchive.org/trends.php), the typical size of HTTP based transactions over the Internet are in the range of a few 10 s of kilobytes up to 1 megabyte. In this size range, the TCP slow start period is a significant part of the total transport period of the packet stream. During TCP slow start the performance is latency limited. Hence, improved latency can rather easily be showed to improve the average throughput for this type of TCP based data transactions.

Radio resource efficiency could be positively impacted by latency reductions. Lower packet data latency could increase the number of transmissions possible within a certain delay bound; hence, higher Block Error Rate (BLER) targets could be used for the data transmissions freeing up radio resources potentially improving the capacity of the system.

One area to address when it comes to packet latency reductions is the reduction of transport time of data and control signaling by addressing the length of a Transmission Time Interval (TTI). In LTE Release 8, a TTI corresponds to one SF of length 1 ms. One such 1 ms TTI is constructed by using 14 Orthogonal Frequency Division Multiplexing (OFDM) or Single Carrier Frequency Division Multiple Access (SC-FDMA) symbols in the case of normal cyclic prefix and 12 OFDM or SC-FDMA symbols in the case of extended cyclic prefix. In LTE Release 13, a study item was started during 2015 with the goal of specifying transmissions with shorter TTIs that are much shorter than the LTE Release 8 TTI. These shorter TTIs are referred to as short TTIs (sTTIs).

The sTTI can be decided to have any duration in time and comprise resources on a number of OFDM or SC-FDMA symbols within a 1 ms SF. As one example, the duration of the sTTI may be 0.5 ms, i.e. seven OFDM or SC-FDMA symbols for the case with normal cyclic prefix. In that case the short TTI transmission is equivalent to (i.e., can be referred to as) a slot transmission. Another example is a sTTI of only two OFDM or SC-FDMA symbols. In that case the short TTI transmission is equivalent to a subslot transmission.

SUMMARY

Systems and methods for determining and utilizing an uplink scheduling timing when using short Transmission Time Intervals (sTTIs) are disclosed. In some embodiments, a method of operation of a wireless device in a cellular communications network comprises receiving an uplink grant in sTTI n; determining, based on a configured uplink/downlink configuration, an uplink scheduling timing l; and transmitting, in a sTTI n+l, an uplink transmission in accordance with the uplink grant received in the sTTI n. In this manner, an uplink timing is determined and utilized when using sTTIs.

In some embodiments, the uplink scheduling timing l is a smallest integer number of sTTIs that is larger than or equal to a predefined minimum uplink scheduling timing value such that n+l is an uplink sTTI.

In some embodiments, the uplink scheduling timing l is defined based on a load balancing approach in which uplink scheduling grants are equally distributed over different downlink sTTIs.

In some embodiments, the uplink grant schedules multiple uplink sTTIs for the same wireless device. Further, in some embodiments, the uplink grant comprises an indication of one or more uplink sTTIs for which the uplink grant is valid.

In some embodiments, an Uplink Part of Special Subframes (UpPTSs) can be used for uplink data transmission, and determining the uplink scheduling timing l comprises determining the uplink scheduling timing l in such a manner that the UpPTSs are treated as uplink sTTIs.

In some embodiments, determining the uplink scheduling timing l comprises determining the uplink scheduling timing l based on a predefined table that defines values of l for different values of n for the Time Division Duplexing (TDD) uplink/downlink configuration. Further, in some embodiments, the predefined table defines the values of l for the different values of n for the TDD uplink/downlink configuration in such a manner that UpPTSs are treated as uplink sTTIs. In some other embodiments, the predefined table defines the values of l for the different values of n for the TDD uplink/downlink configuration in such a manner that UpPTSs are not treated as uplink sTTIs. In some embodiments, the predefined table defines the values of l for the different values of n in accordance with a latency optimization scheme. In some other embodiments, the predefined table defines the values of l for the different values of n in accordance with a load sharing scheme.

In some embodiments, the sTTI n and the sTTI n+l each have a duration of less than 1 millisecond (ms). In some other embodiments, the sTTI n and the sTTI n+l each have a duration of less than 0.5 ms.

Embodiments of a wireless device for a cellular communications network are also disclosed. In some embodiments, a wireless device for a cellular communications network is adapted to receive an uplink grant in sTTI n; determine, based on a configured uplink/downlink configuration, an uplink scheduling timing l; and transmit, in a sTTI n+l, an uplink transmission in accordance with the uplink grant received in the sTTI n.

In some embodiments, a wireless device for a cellular communications network comprises at least one transceiver, at least one processor, and memory comprising instructions executable by the at least one processor whereby the wireless device is operable to: receive an uplink grant in sTTI n; determine, based on a configured uplink/downlink configuration, an uplink scheduling timing l; and transmit, in a sTTI n+l, an uplink transmission in accordance with the uplink grant received in the sTTI n.

In some embodiments, a wireless device for a cellular communications network comprises a receiving module, a determining module, and a transmitting module. The receiving module is operable to receive an uplink grant in sTTI n. The determining module is operable to determine, based on a configured uplink/downlink configuration, an uplink scheduling timing l. The transmitting module is operable to transmit, in a sTTI n+l, an uplink transmission in accordance with the uplink grant received in the sTTI n.

Embodiments of a method of operation of radio access node in a cellular communications network are also disclosed. In some embodiments, a method of operation of a radio access node in a cellular communications network comprises transmitting an uplink grant to a wireless device in a sTTI n and receiving, in a sTTI n+k, an uplink transmission from the wireless device in accordance with the uplink grant transmitted to the wireless device in the sTTI n.

In some embodiments, the uplink scheduling timing l is a smallest integer number of sTTIs that is larger than or equal to a predefined minimum uplink scheduling timing value such that n+l is an uplink sTTI.

In some embodiments, the uplink scheduling timing l is defined based on a load balancing approach in which uplink scheduling grants are equally distributed over different downlink sTTIs.

In some embodiments, the uplink grant schedules multiple uplink sTTIs for the same wireless device. Further, in some embodiments, the uplink grant comprises an indication of one or more uplink sTTIs for which the uplink grant is valid.

In some embodiments, UpPTSs can be used for uplink data transmission, and the uplink scheduling timing l is determined in such a manner that the UpPTSs are treated as uplink sTTIs. In some other embodiments, the uplink scheduling timing l is determined based on a predefined table that defines values of l for different values of n for the TDD uplink/downlink configuration. In some embodiments, the predefined table defines the values of l for the different values of n for the TDD uplink/downlink configuration in such a manner that UpPTSs are treated as uplink sTTIs. In some other embodiments, the predefined table defines the values of l for the different values of n for the TDD uplink/downlink configuration in such a manner that UpPTSs are not treated as uplink sTTIs. In some embodiments, the predefined table defines the values of l for the different values of n in accordance with a latency optimization scheme. In some other embodiments, the predefined table defines the values of l for the different values of n in accordance with a load sharing scheme.

In some embodiments, the sTTI n and the sTTI n+l each have a duration of less than 1 ms. In some other embodiments, the sTTI n and the sTTI n+l each have a duration of less than 0.5 ms.

Embodiments of a radio access node for a cellular communications network are also disclosed. In some embodiments, a radio access node for a cellular communications network is adapted to transmit an uplink grant to a wireless device in a sTTI n and receive, in a sTTI n+k, an uplink transmission from the wireless device in accordance with the uplink grant transmitted to the wireless device in the sTTI n.

In some embodiments, a radio access node for a cellular communications network comprises at least one transceiver, at least one processor, and memory comprising instructions executable by the at least one processor whereby the radio access node is operable to transmit an uplink grant to a wireless device in a sTTI n and receive, in a sTTI n+k, an uplink transmission from the wireless device in accordance with the uplink grant transmitted to the wireless device in the sTTI n.

In some embodiments, a radio access node for a cellular communications network comprises a transmitting module operable to transmit an uplink grant to a wireless device in a sTTI n and a receiving module operable to receive, in a sTTI n+k, an uplink transmission from the wireless device in accordance with the uplink grant transmitted to the wireless device in the sTTI n.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 11 and 12 illustrate uplink scheduling timing for TDD configuration 5 according to some embodiments of the present disclosure;

FIGS. 13A, 13B, 14A, 14B, and 15 illustrate uplink scheduling timing for TDD configuration 6 according to some embodiments of the present disclosure;

FIGS. 16A, 16B, 17A, and 17B illustrate uplink scheduling timing for TDD configuration 0 according to some embodiments of the present disclosure;

DETAILED DESCRIPTION

Figure 1:
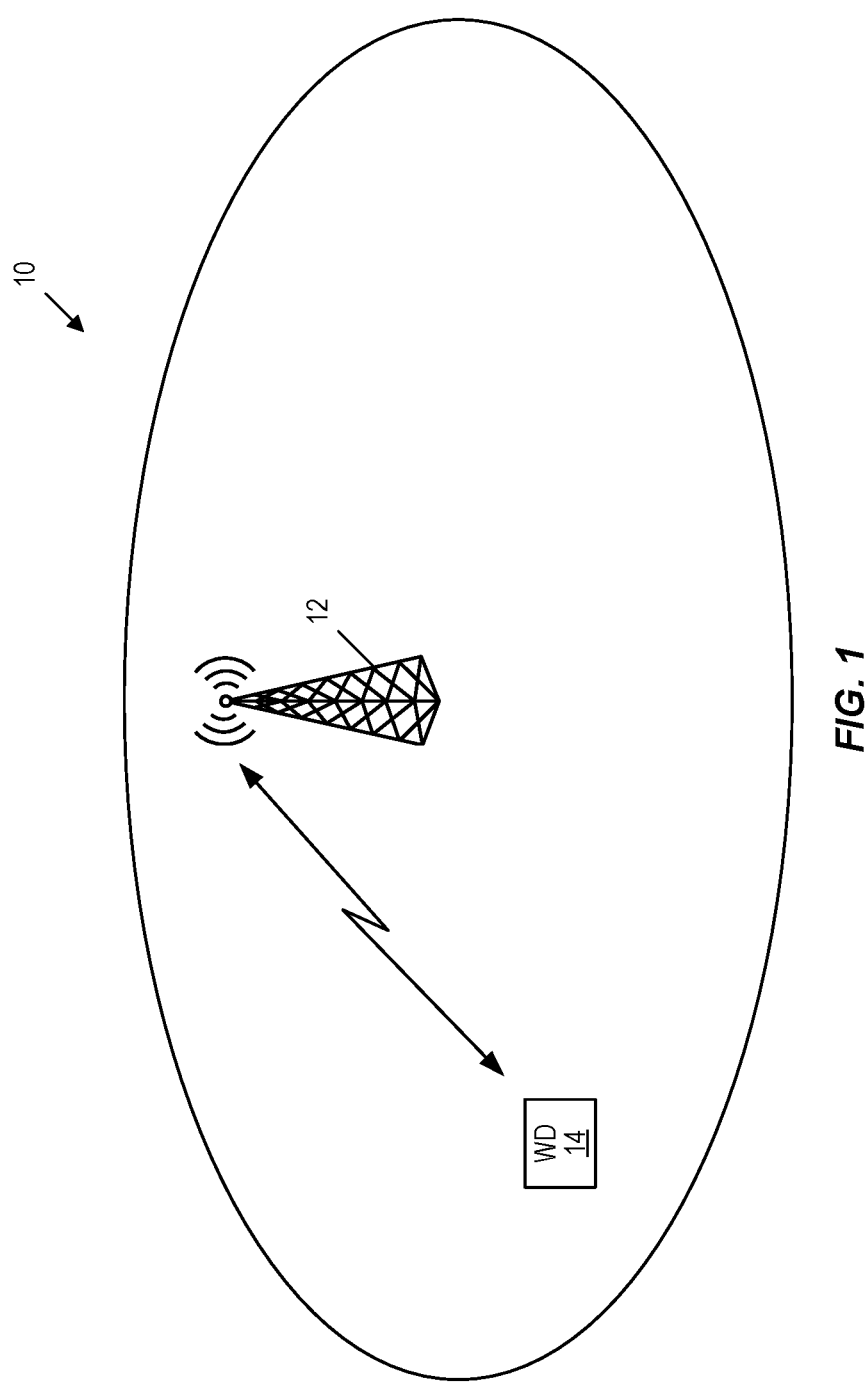
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

In LTE Release 8, a Transmission Time Interval (TTI) corresponds to one Subframe (SF) of length 1 millisecond (ms). One such 1 ms TTI is constructed by using fourteen Orthogonal Frequency Division Multiplexing (OFDM) or Single Carrier Frequency Division Multiple Access (SC-FDMA) symbols in the case of normal cyclic prefix and 12 OFDM or SC-FDMA symbols in the case of extended cyclic prefix. In LTE Release 13, a study item was started in 2015 with the goal of specifying transmissions with shorter TTIs that are much shorter than the LTE Release 8 TTI. These shorter TTIs are referred to as short TTIs (sTTIs).

The sTTI can be decided to have any duration in time and comprise resources on a number of OFDM or SC-FDMA symbols within a 1 ms SF. As one example, the duration of the sTTI may be 0.5 ms, i.e. seven OFDM or SC-FDMA symbols for the case with normal cyclic prefix. Another example is a sTTI of only two OFDM or SC-FDMA symbols.

By shortening the TTI length, the time between receiving an uplink grant and the uplink transmission can also be reduced. Moreover, by introducing sTTI to the Uplink Part of a Special Subframe (UpPTS) of the existing special SFs, it becomes possible to transmit short Physical Uplink Shared Channel (sPUSCH) within the special SFs. Therefore, a new uplink scheduling timing table needs to be defined for Time Division Duplexing (TDD) with shortened TTI.

Two different methods, i.e., latency optimized and load balancing, are proposed for the design of a new uplink scheduling-timing table for supporting sTTI operations in TDD.

For the latency optimized approach, the uplink scheduling grant sent in sTTI n is valid for sTTI n+l, where l is the smallest value larger than or equal to a predefined minimum timing such that n+l is an uplink sTTI.

For the load balancing approach, the uplink scheduling assignments are equally distributed over different downlink sTTIs.

Methods for designing uplink scheduling timing with uplink data transmission on UpPTS are proposed.

The proposed solution provides a new uplink scheduling timing table to enable sTTI transmissions in TDD. The latency optimized solution can offer the largest latency reduction gain. On the other hand, the load balancing based solution can simplify the Hybrid Automatic Repeat Request (HARQ) and control design, with reduced control signaling overhead.

FIG. 1 illustrates one example of a cellular communications network 10 in which embodiments of the present disclosure may be implemented. As illustrated, the cellular communications network 10 includes a radio access node 12 (e.g., a base station or eNB) and a wireless device 14. In the embodiments described herein, the radio access node 12 and the wireless device 14 operate according to a TDD scheme in which some SFs are downlink SFs, some SFs are uplink SFs, and some SFs are special SFs. Embodiments of the present disclosure relate to uplink scheduling timing for sTTI operations in TDD.

Two different methods, i.e., latency optimized and load balancing, are proposed for the design of a new uplink scheduling-timing table for supporting sTTI operations in TDD.

It is further understood that the timing designs can be extended to support Carrier Aggregation (CA) with both Frequency Division Duplexing (FDD) and TDD carriers, among different TDD carriers and also among Frame Structure (FS) type 3 (FS3) carriers and TDD carriers. The timing relations that will be used are formed from the design provided in the present disclosure and extends the CA design.

In one embodiment, the timing relations are designed based on the latency optimized approach; that is, the uplink scheduling grant sent in sTTI n is valid for sTTI n+l, where l is the smallest value larger than or equal to a predefined minimum timing such that n+l is an uplink sTTI.

In another embodiment, the timing relations are designed based on the load balancing approach; that is, the uplink scheduling assignments are equally distributed over different downlink sTTIs.

In one embodiment, the timing relations for different downlink/uplink configurations are designed based on different approaches, i.e., some downlink/uplink configurations are designed based on the latency optimization approach, while the other downlink/uplink configurations are designed based on the load balancing approach.

In one embodiment, if multiple uplink sTTIs need to be scheduled in one downlink sTTI, then the same UE is scheduled on all these uplink sTTIs based on the same uplink Downlink Control Information (DCI), such that only one uplink scheduling grant needs to be sent from the downlink sTTI.

In another embodiment, if multiple uplink sTTIs need to be scheduled in one downlink sTTI, then a field in the uplink DCI, e.g., an Uplink Index (UI) field, is used to signal for which uplink sTTI(s) the grant is valid. If a load balancing approach is adopted to spread out the uplink grants, the number of bits in the uplink field can be limited, e.g. to 2 bits.

In one embodiment, UpPTS of the special SFs can be used for uplink data transmission, and the uplink scheduling timing for all uplink sTTI transmissions are designed based on either the latency optimized approach or the load balancing approach, by treating UpPTS as an uplink sTTI, i.e., by taking the scheduling of uplink data transmission in UpPTS into account.

In another embodiment, UpPTS of the special SFs can be used for uplink data transmission, and the uplink scheduling timing for all uplink sTTI transmissions within legacy uplink SFs are firstly designed based on either the latency optimized approach or the load balancing approach, by not taking scheduling of data transmission in UpPTS into account; then, the uplink scheduling timing for data transmission in sTTI(s), which consist(s) of UpPTS, is added on top of the latency optimized approach or the load balancing approach.

Figure 2:
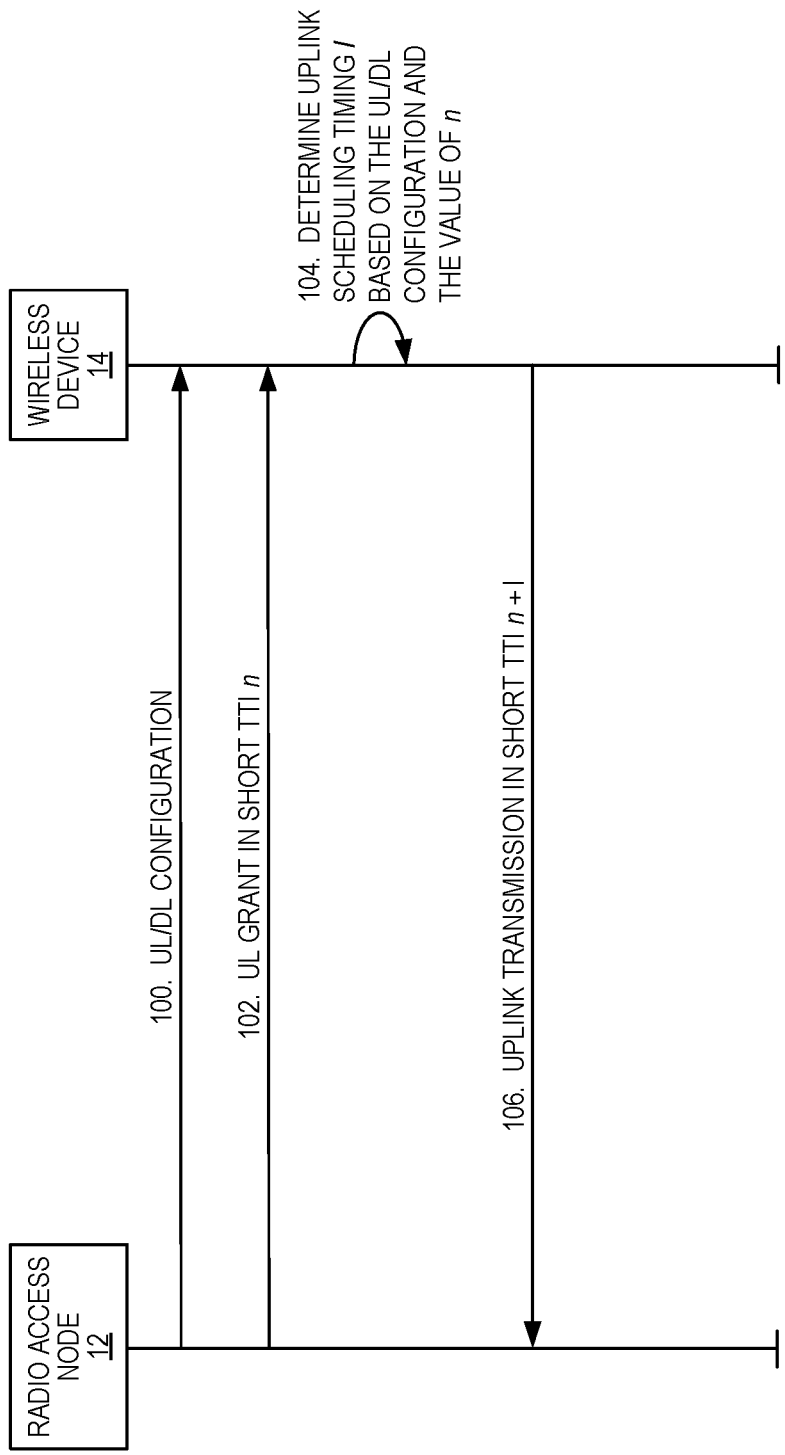
FIG. 2 illustrates the operation of the radio access node and the wireless device of FIG. 1 according to some embodiments of the present disclosure.

In this regard, FIG. 2 illustrates the operation of the radio access node 12 and the wireless device 14 according to some embodiments of the present disclosure. As illustrated, the radio access node 12 transmits (e.g., broadcasts) an uplink/downlink (UL/DL) configuration (step 100). At some point, the radio access node 12 transmits an uplink grant to the wireless device 14 in sTTI n (step 102). Based on the uplink/downlink configuration and the value of n, the wireless device 14 determines an uplink timing l for transmitting an uplink transmission to the radio access node 12 in accordance with the uplink grant (step 104). As described herein, the uplink timing l is an integer value larger than or equal to a predefined minimum timing such that sTTI n+l is an uplink sTTI. In some embodiments, the predefined minimum timing is 2. In some other embodiments, the predefined minimum timing is 3. In some other embodiments, the predefined minimum timing is 4. However, 2, 3, or 4 are only examples for the predefined minimum timing.

As described herein, in some embodiments, the UpPTS can be used for uplink data transmission, and the wireless device 14 determines the uplink scheduling timing l in such a manner that the UpPTSs are treated as uplink TTIs. As also described herein, in some other embodiments, the UpPTS cannot be used for uplink data transmission, and the wireless device 14 determines the uplink scheduling timing l in such a manner that the UpPTSs are not treated as uplink TTIs.

As discussed herein, in some embodiments, the wireless device 14 determines the uplink timing l based on predefined tables (e.g., tables specified in a standard). As an example, the uplink timing l may be determined using the tables defined below. In some embodiments, the uplink timing l is defined in accordance with a latency optimization approach. In the latency optimized approach, the uplink timing l is the smallest value larger than or equal to a predefined minimum timing such that sTTI n+l is an uplink sTTI. In other embodiments, the uplink timing l is defined in accordance with a load balancing approach. Notably, as discussed above, in some embodiments, if multiple uplink sTTIs need to be scheduled in one downlink sTTI, then the same wireless device 14 is scheduled on all of these uplink sTTIs, e.g., based on the same uplink DCI such that only one uplink scheduling grant is sent in the downlink sTTI. In other embodiments, if multiple uplink sTTIs need to be scheduled in one downlink sTTI, then a field in the uplink DCI, e.g., a UI field, is used to signal for which uplink sTTI(s) the grant is valid. If a load balancing approach is adopted to spread out the uplink grants, it can done so to consider to limit the number of bits in the uplink field, e.g. to 2 bits. Further, in some embodiments, the uplink timing l is determined (e.g., the predefined tables are defined) such that the UpPTS of the special SFs are treated as uplink sTTIs. In other embodiments, UpPTS of the special SFs can be used for uplink data transmission, and the uplink scheduling timing l for all uplink sTTI transmissions within legacy uplink SFs are firstly designed based on either the latency optimized approach or the load balancing approach by not taking scheduling of data transmission in UpPTS into account; then, the uplink scheduling timing for data transmission in sTTI(s), which consist(s) of UpPTS, is added on top of the latency optimized approach or the load balancing approach. In a similar manner, the radio access node 12 knows the uplink timing l such that the radio access node 12 knows when to expect the respective uplink transmission from the wireless device 14. The wireless device 14 transmits, and the radio access node 12 receives, the uplink transmission in sTTI n+l (step 106).

In the following, some examples on how to form the uplink scheduling table for 7-symbol TTI, i.e., slot-based sTTI, in TDD are given. Note that the same methodology applies for other lengths of sTTI. Here, the minimum timing for uplink scheduling is assumed to be four times of the sTTI length.

Figure 3:
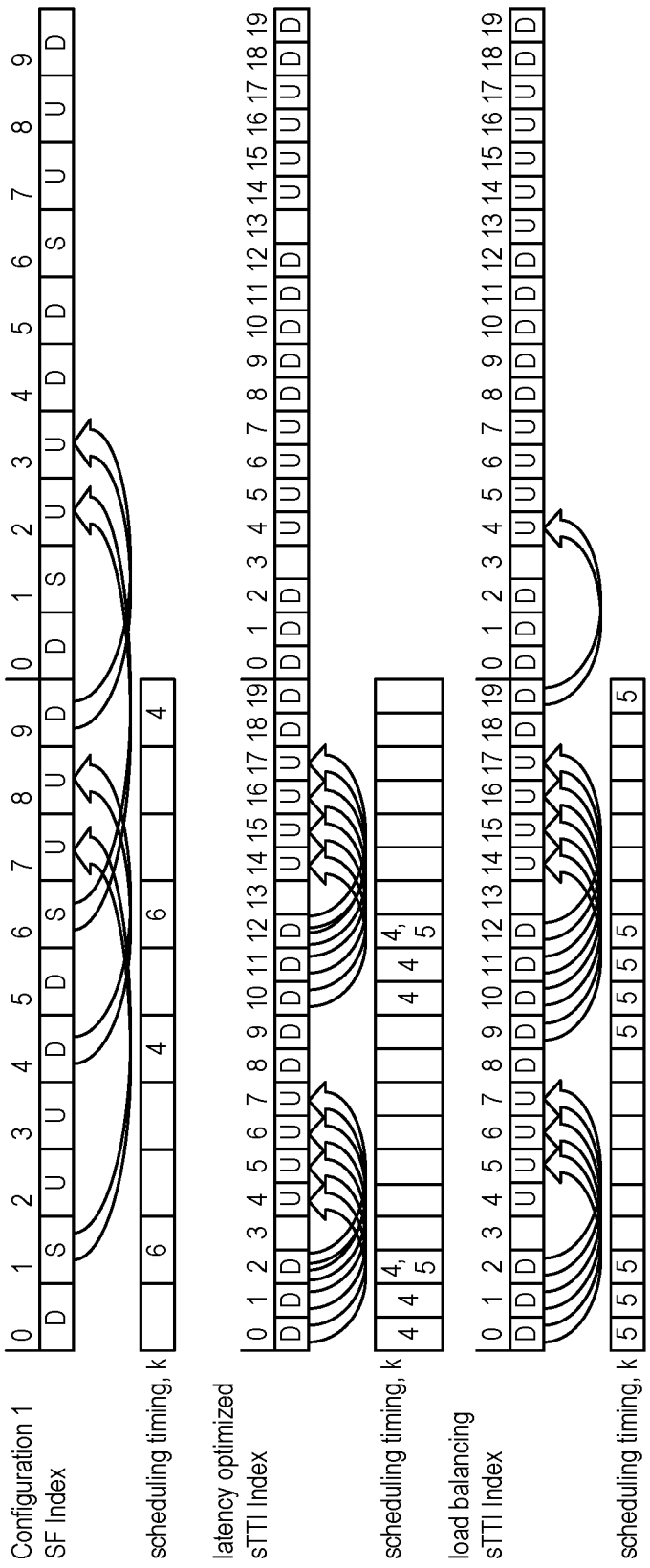
FIGS. 3 and 4 illustrate uplink scheduling timing for Time Division Duplexing (TDD) configuration 1 according to some embodiments of the present disclosure.
Figure 4:
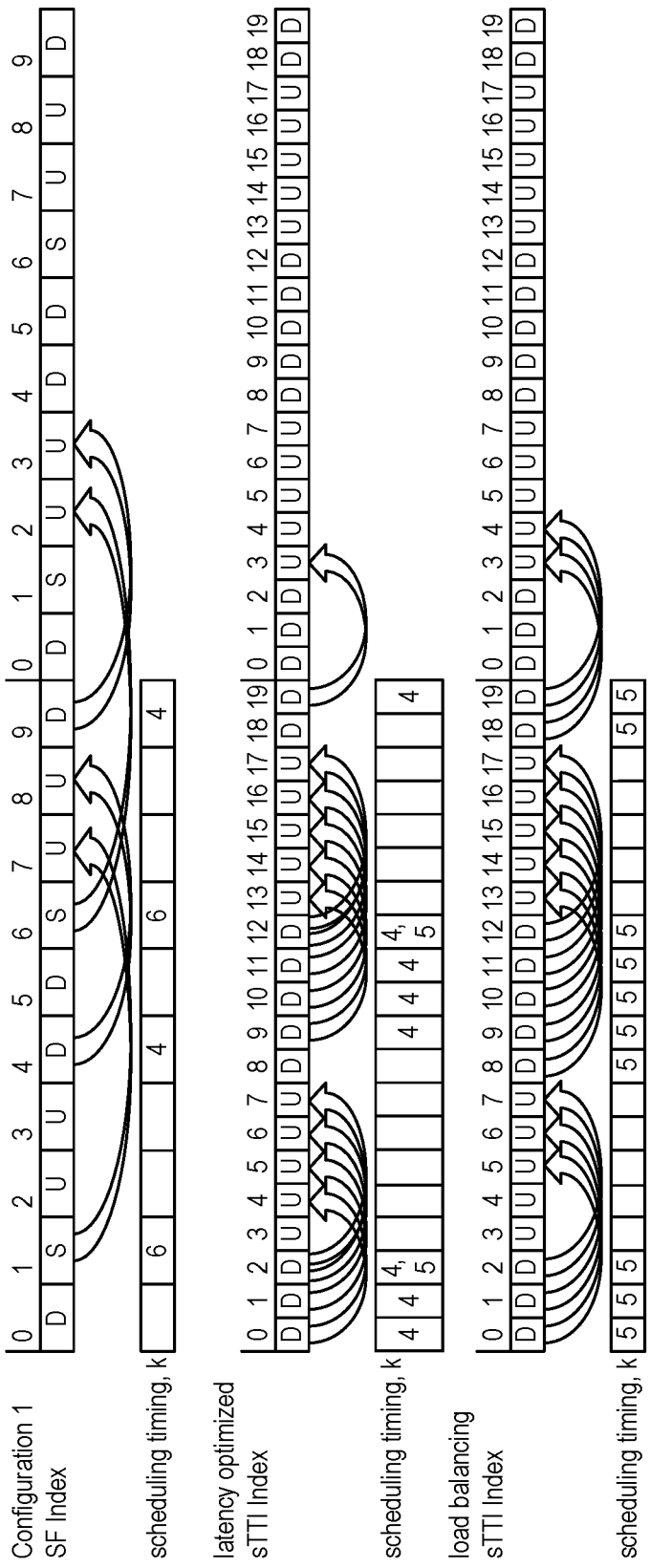

FIG. 3 and FIG. 4 illustrate the uplink scheduling timing for seven-symbol sTTI in TDD uplink scheduling timing for TDD downlink/uplink configuration 1 for the cases of without and with uplink data transmission on UpPTS, respectively.

For both cases, there are multiple uplink sTTIs that are associated to a single downlink sTTI when using the latency optimized approach. For example, based on the latency optimized approach, the scheduling grants related to uplink sTTI 6 and sTTI 7 are both sent from the downlink sTTI 2. This can be done by adding a few bits in the uplink DCI to indicate the scheduled sTTI(s). Another way of handling this multi-uplink sTTI scheduling issue is to restrict that the same wireless device 14 is scheduled for all these uplink sTTIs by using the same uplink DCI signaled from the downlink sTTI.

It is also observed that, for TDD downlink/uplink configuration 1, adding scheduling grants for data transmission on UpPTS does not affect the scheduling timing for the other uplink sTTIs if the same design approach, i.e., latency optimized or load balancing, is adopted.

Figure 5:
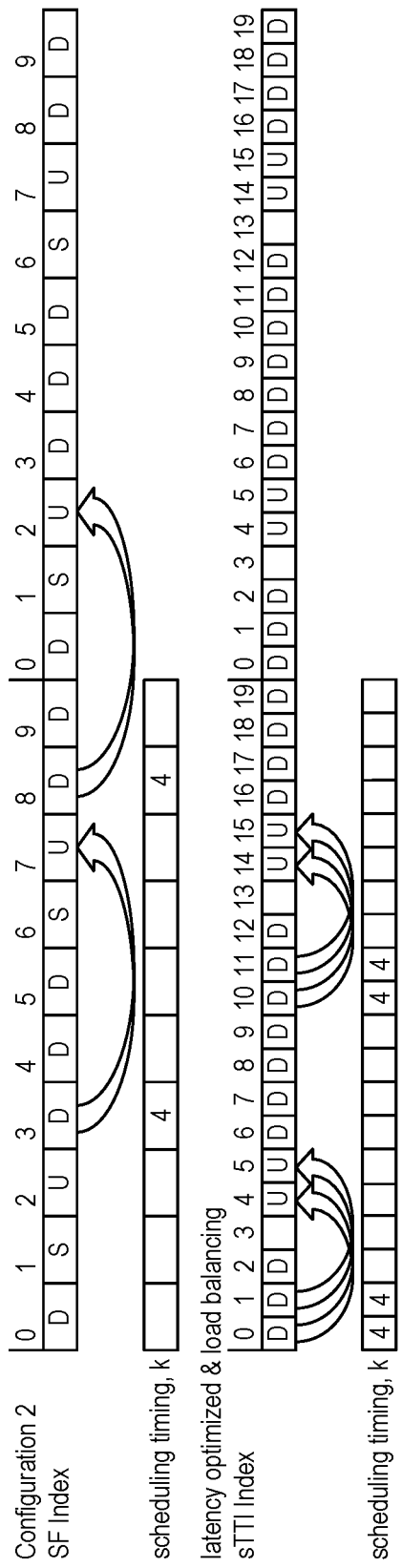
FIGS. 5 and 6 illustrate uplink scheduling timing for TDD configuration 2 according to some embodiments of the present disclosure.
Figure 6:
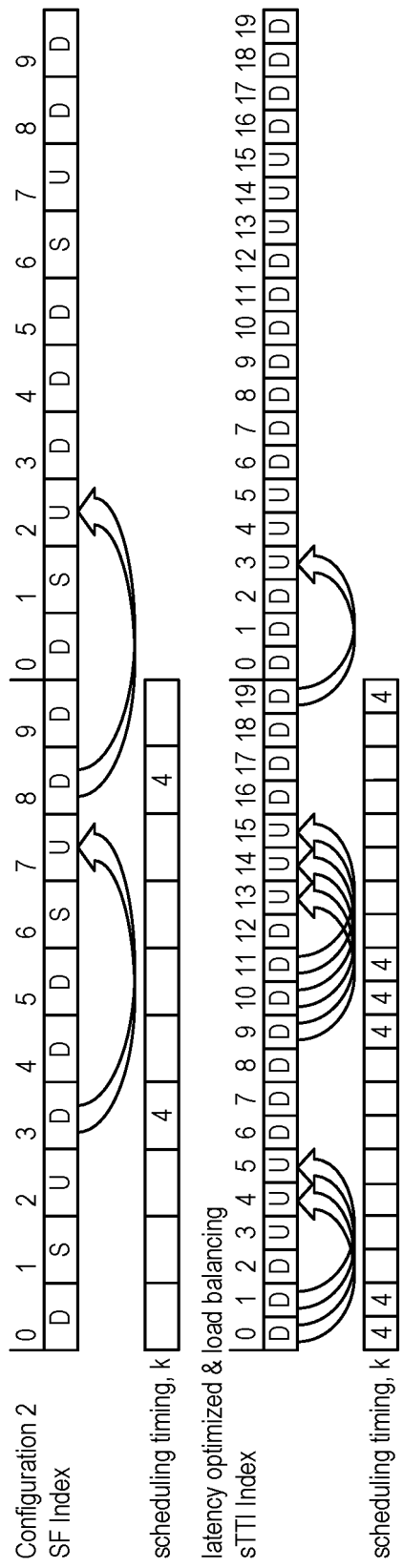

FIG. 5 and FIG. 6 illustrate the uplink scheduling timing for seven-symbol sTTI in TDD uplink scheduling timing for TDD downlink/uplink configuration 2 for the cases of without and with uplink data transmission on UpPTS, respectively. The latency optimized approach and the load balancing approach give the same solution of uplink scheduling timing.

It can be seen that, for TDD downlink/uplink configuration 2, adding scheduling grants for data transmission on UpPTS does not affect the scheduling timing for the other uplink sTTIs.

Figure 7:
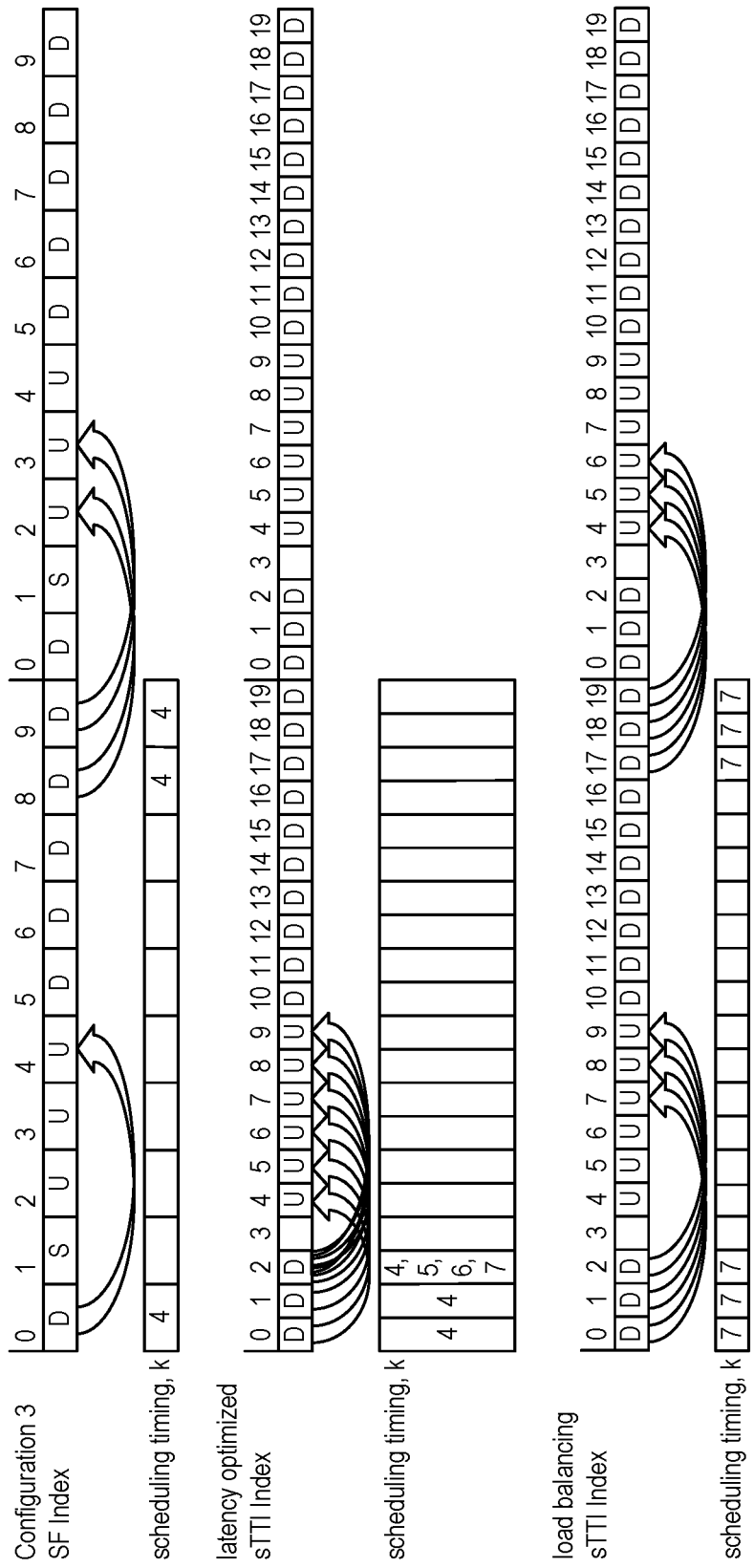
FIGS. 7 and 8 illustrate uplink scheduling timing for TDD configuration 3 according to some embodiments of the present disclosure.
Figure 8:
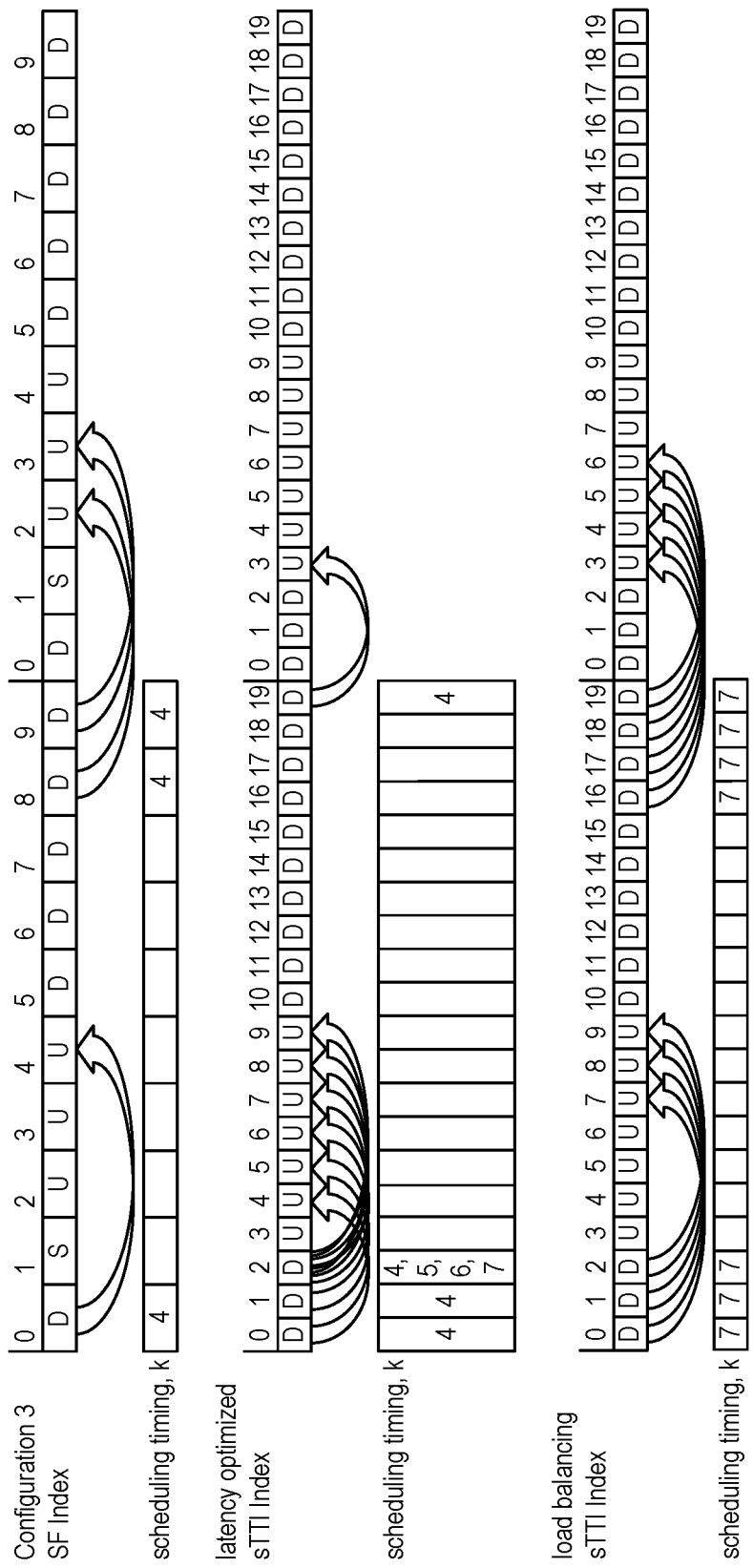

FIG. 7 and FIG. 8 illustrate the uplink scheduling timing for seven-symbol sTTI in TDD uplink scheduling timing for TDD downlink/uplink configuration 3 for the cases of without and with uplink data transmission on UpPTS, respectively.

For the latency optimized approach, there are four uplink sTTIs associated with downlink sTTI 2. To handle this multi-uplink sTTI scheduling issue, the methods discussed above can be used.

We see that, for TDD downlink/uplink configuration 3, adding scheduling grants for data transmission on UpPTS does not affect the scheduling timing for the other uplink sTTIs if the same design approach, i.e., latency optimized or load balancing, is adopted.

Figure 9:
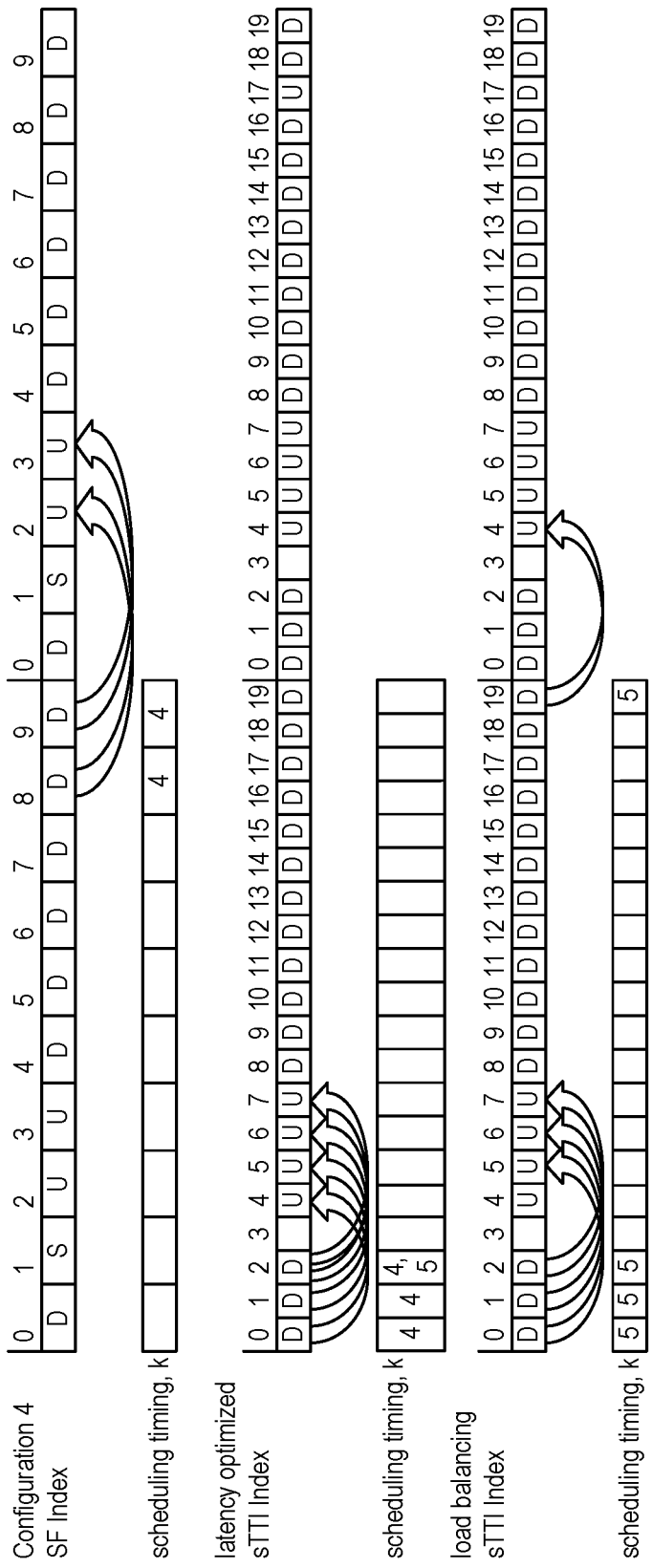
FIGS. 9 and 10 illustrate uplink scheduling timing for TDD configuration 4 according to some embodiments of the present disclosure.
Figure 10:
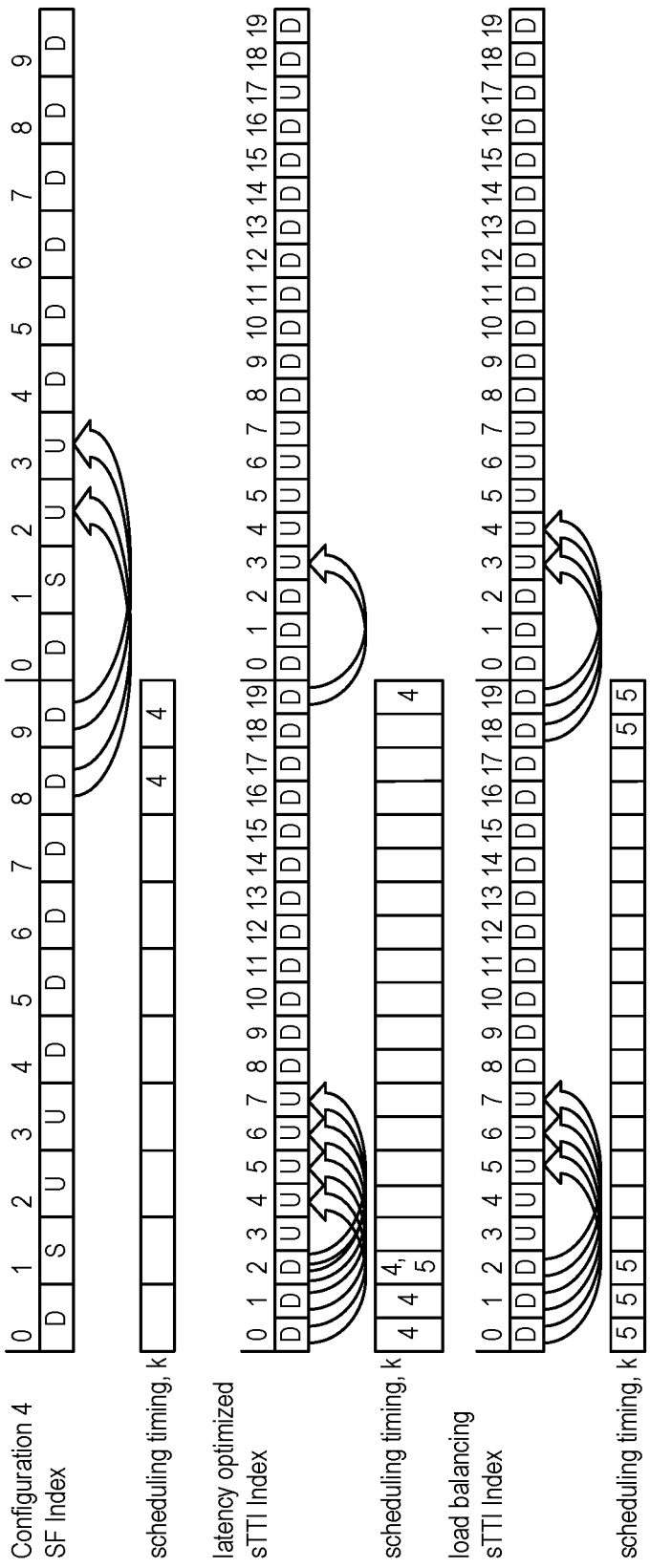

FIG. 9 and FIG. 10 illustrate the uplink scheduling timing for seven-symbol sTTI in TDD uplink scheduling timing for TDD downlink/uplink configuration 4 for the cases of without and with uplink data transmission on UpPTS, respectively.

For the latency optimized approach, there are two uplink sTTIs associated with downlink sTTI 2. To handle this multi-uplink sTTI scheduling issue, the methods discussed above can be used.

We see that, for TDD downlink/uplink configuration 4, adding scheduling grants for data transmission on UpPTS does not affect the scheduling timing for the other uplink sTTIs if the same design approach, i.e., latency optimized or load balancing, is adopted.

FIG. 11 and FIG. 12 illustrate the uplink scheduling timing for seven-symbol sTTI in TDD uplink scheduling timing for TDD downlink/uplink configuration 5 for the cases of without and with uplink data transmission on UpPTS, respectively. It can be seen that, for TDD downlink/ uplink configuration 5, adding scheduling grants for data transmission on UpPTS does not affect the scheduling timing for the other uplink sTTIs.

Figure 13B:
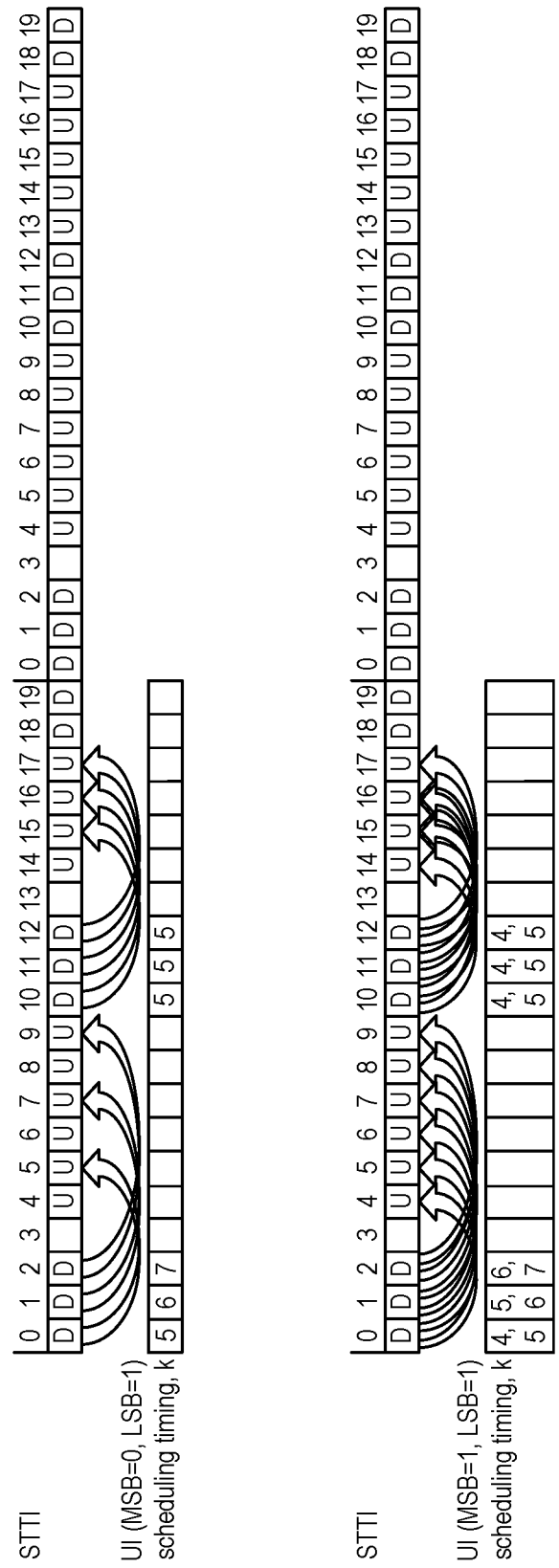

FIGS. 13A and 13B illustrate the uplink scheduling timing for seven-symbol sTTI in TDD uplink scheduling timing for TDD downlink/uplink configuration 6 for the cases of no uplink data transmission on UpPTS.

Similar to configuration 3, with the latency optimized approach, there are four uplink sTTIs associated to downlink sTTI 2, and two uplink sTTIs associated to downlink sTTI 12. To handle this multi-uplink sTTI scheduling issue, the methods discussed above can be used.

Even with the load balancing method, for uplink/downlink configuration 6, where the number of downlink sTTIs is smaller than that of uplink sTTIs, the number of uplink sTTIs associated to a certain downlink sTTI can be larger than one. The methods discussed above for handling this multi-uplink sTTI scheduling issue can also be used here. Option 1 shown in FIG. 13 is based on the restricted scheduling method, where the multiple uplink sTTIs associated to the same downlink sTTI are scheduled to the same wireless device 14 by using the same uplink DCI. To enable better scheduling flexibility, Option 2 shown in FIG. 13A gives an example on how to use two bits signaling to indicate the scheduled uplink sTTI.

Figure 14A:
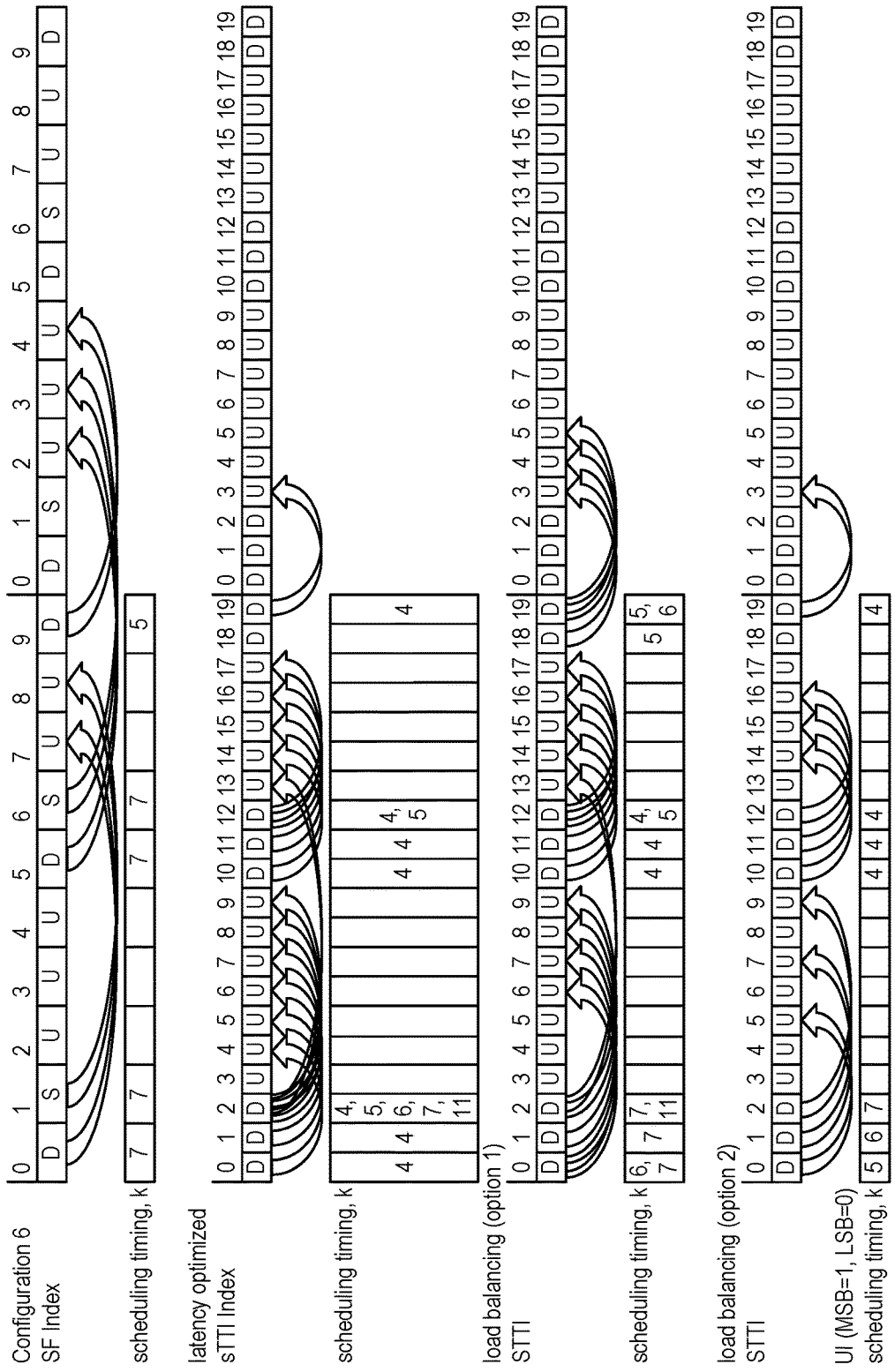
Figure 14B:
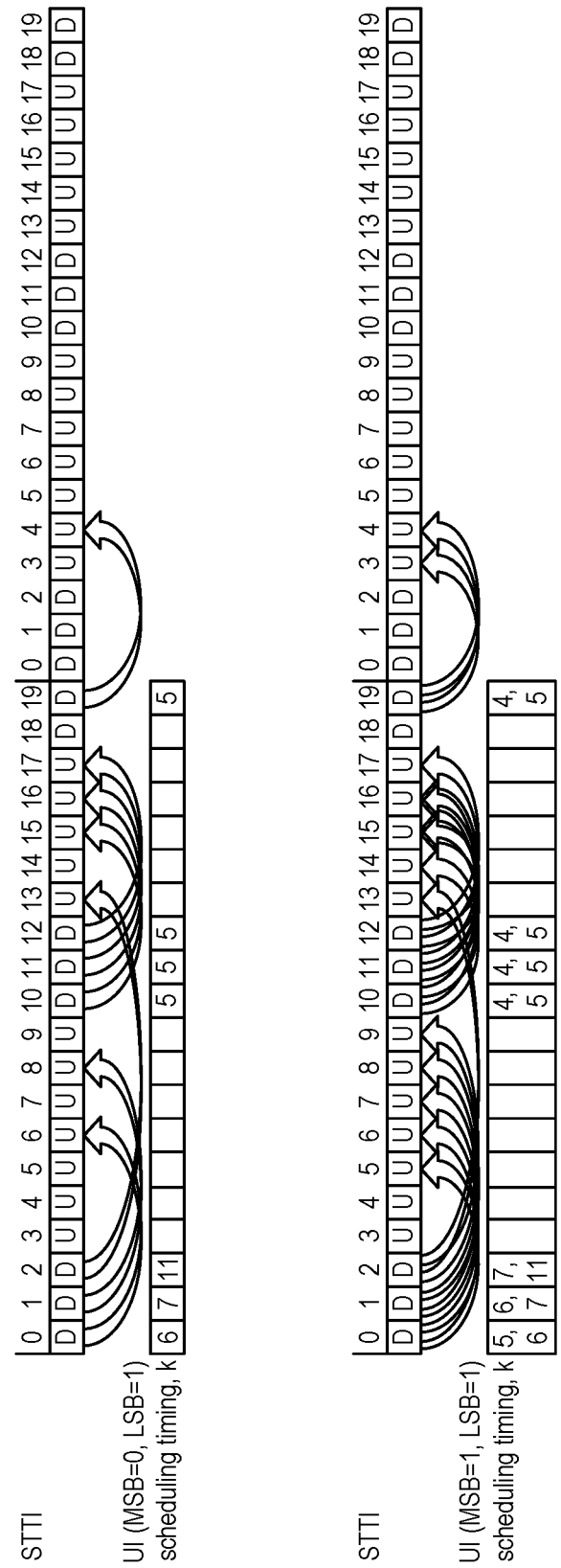
Figure 16A:
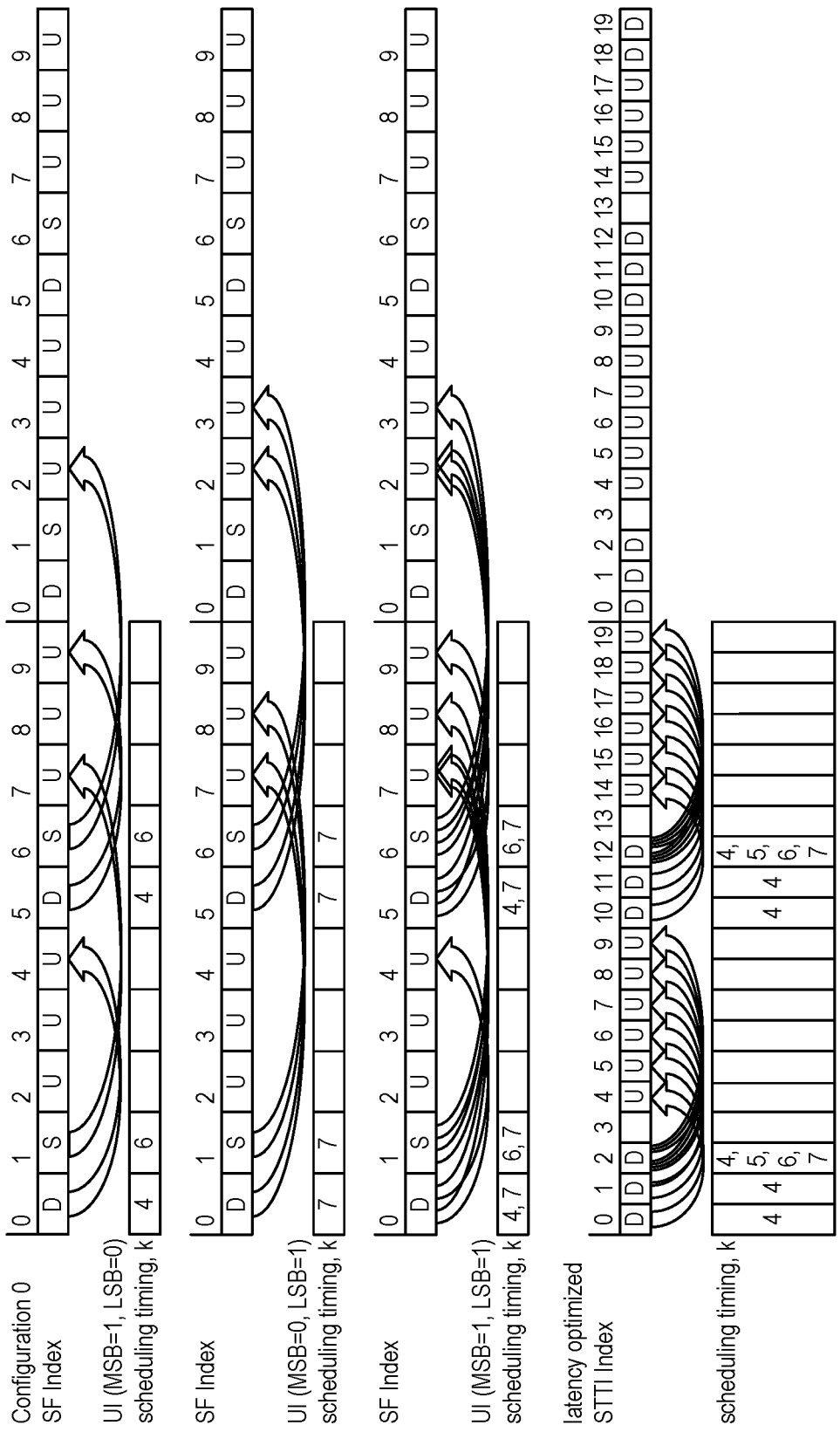

By treating UpPTS as an uplink sTTI and using the same methodology, FIGS. 14A and 14B illustrate the uplink scheduling timing for TDD downlink/uplink configuration 6, for the cases of allowing uplink data transmission on UpPTS. It can be seen that, for TDD downlink/uplink configuration 6, adding scheduling grants for data transmission on UpPTS will affect the scheduling timing for other uplink sTTIs, if load balancing approach is used for the design.

Another way of designing the uplink scheduling timing when allowing for uplink data transmission on UpPTS is to keep the scheduling timing for all the other uplink sTTIs unchanged, and then, on top of it, add new timing relations for UpPTS. FIG. 15 gives an example for adding uplink scheduling timing relations for UpPTS, based on the timing designed in FIGS. 13A and 13B.

Similar to the design for configuration 6, FIGS. 16A and 16B and FIGS. 17A and 17B illustrate the uplink scheduling timing for seven-symbol sTTI in TDD uplink scheduling timing for TDD downlink/uplink configuration 0 for the cases of without and with uplink data transmission on UpPTS, respectively.

Figure 17A:
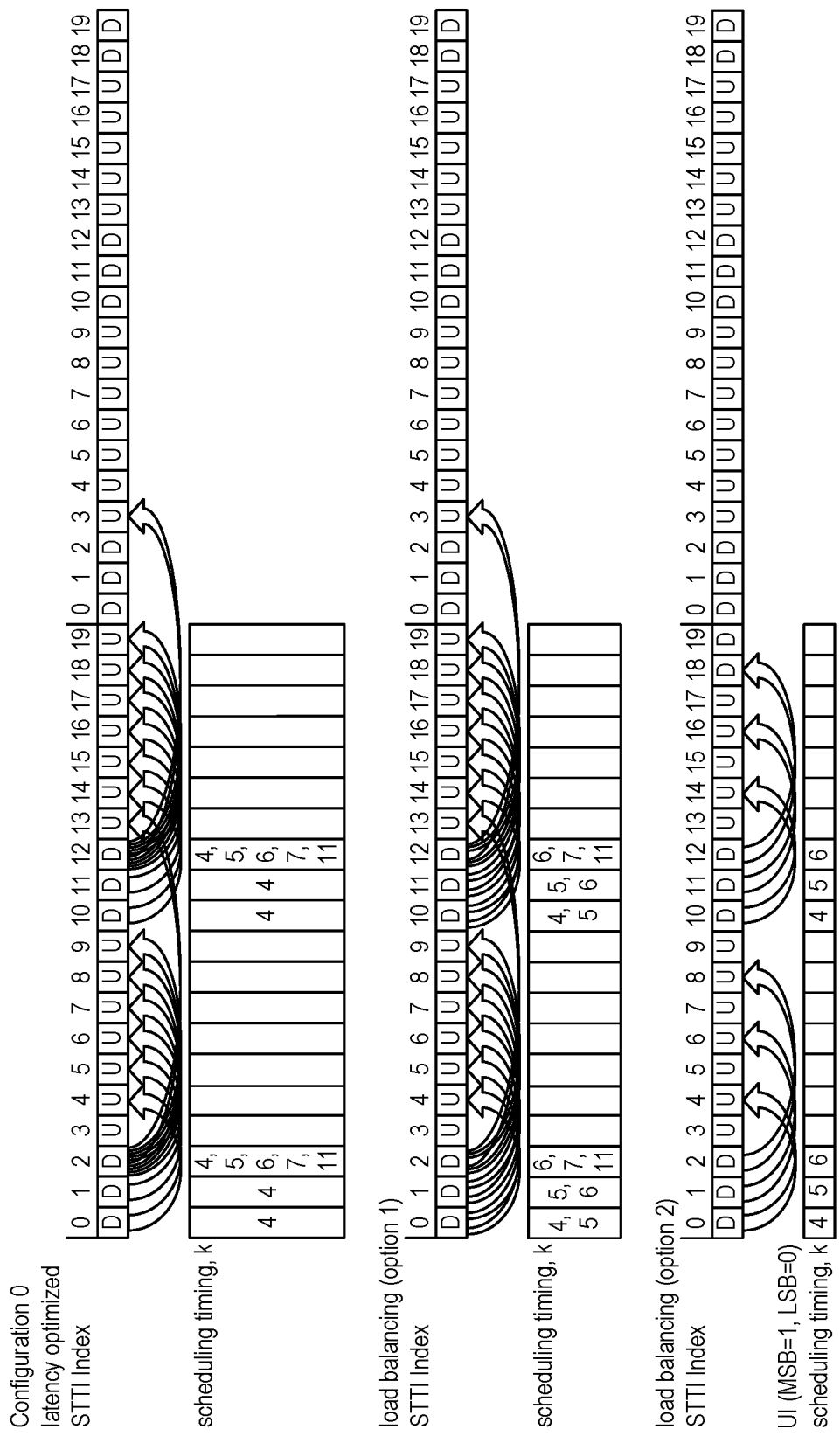
Figure 17B:
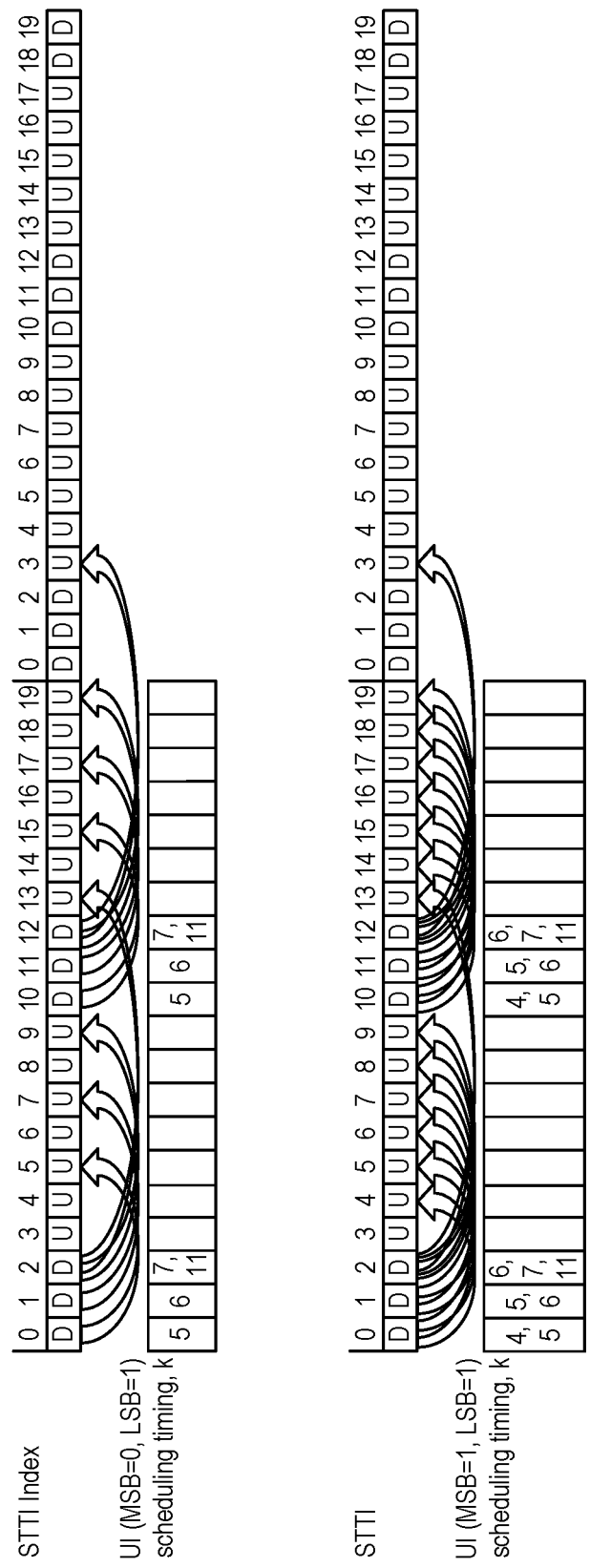

For the example of load balancing approach (option 2) shown in FIG. 17A, two bits are used to signal the scheduled sTTI(s). Based on this example, some uplink sTTIs cannot be scheduled individually. For example, uplink sTTI 9 and sTTI 13 must be scheduled together. If individual scheduling flexibility is required, more bits need to be added to the control signaling.

It can be seen that, for TDD downlink/uplink configuration 6, adding scheduling grants for data transmission on UpPTS does not affect the scheduling timing for the other uplink sTTIs. However, the control signaling mapping, i.e., the UI mapping, needs to be modified.

Uplink scheduling timing for different downlink/uplink configurations shown above can be summarized into tables. Note that, for all examples shown in this section, the minimum uplink scheduling timing is assumed to be four times of the sTTI length. The tables will look different when the minimum scheduling time is different. However, the same methodology can be used for the design of uplink scheduling timing.

The new table can be obtained by using the same design approach, i.e., either latency optimized or load balancing based, for all downlink/uplink configurations. A new table can also be created by using different design approaches for different downlink/uplink configurations.

For the cases where multiple uplink sTTIs are associated to a downlink sTTI, if a field in uplink DCI is used to indicate the scheduled sTTI(s), a mapping relation between the values of this field and the values of scheduling timing should also be given.

Two different methods, i.e., latency optimized and load balancing, are proposed for the design of a new uplink scheduling-timing table for supporting short TTI operations in TDD.

Figure 18:
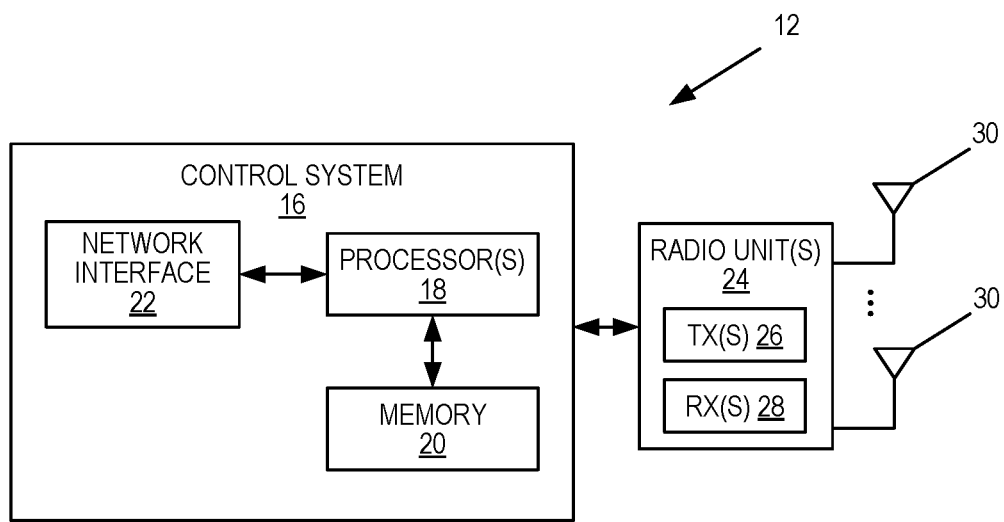
FIGS. 18 through 20 illustrate embodiments of a radio access node.

FIG. 18 is a schematic block diagram of the radio access node 12 according to some embodiments of the present disclosure. As illustrated, the radio access node 12 includes a control system 16 that includes one or more processors 18 (e.g., Central Processing Units (CPUs), Application Specific Integrated Circuits (ASICs), Field Programmable Gate Arrays (FPGAs), and/or the like), memory 20, and a network interface 22. In addition, the radio access node 12 includes one or more radio units 24 that each includes one or more transmitters 26 and one or more receivers 28 coupled to one or more antennas 30. In some embodiments, the radio unit(s) 24 is external to the control system 16 and connected to the control system 16 via, e.g., a wired connection (e.g., an optical cable). However, in some other embodiments, the radio unit(s) 24 and potentially the antenna(s) 30 are integrated together with the control system 16. The one or more processors 18 operate to provide one or more functions of a radio access node 12 as described herein. In some embodiments, the function(s) are implemented in software that is stored, e.g., in the memory 20 and executed by the one or more processors 18.

Figure 19:
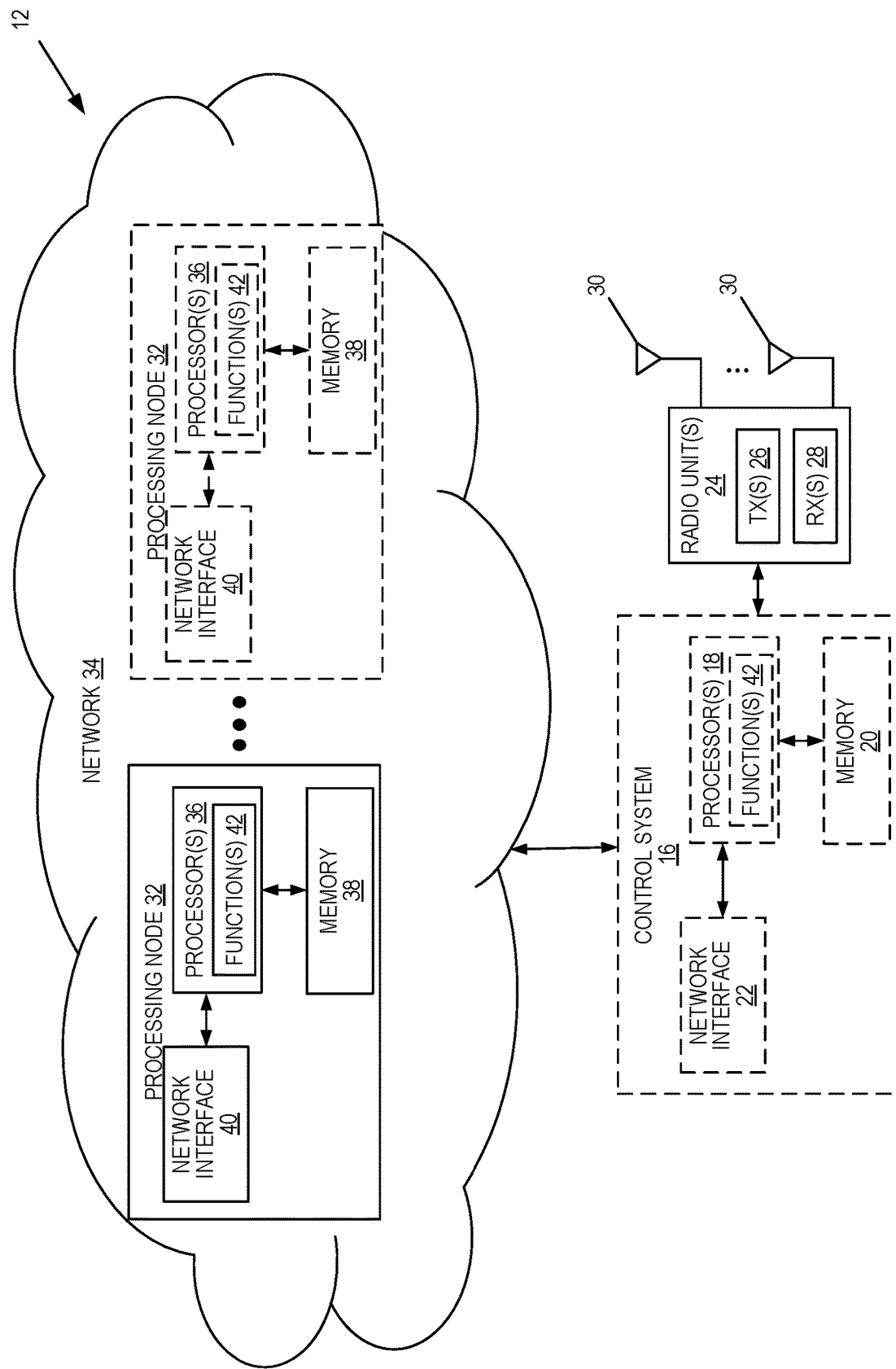

FIG. 19 is a schematic block diagram that illustrates a virtualized embodiment of the radio access node 12 according to some embodiments of the present disclosure. This discussion is equally applicable to other types of network nodes. Further, other types of network nodes may have similar virtualized architectures.

As used herein, a "virtualized" radio access node 12 is an implementation of the radio access node 12 in which at least a portion of the functionality of the radio access node 12 is implemented as a virtual component(s) (e.g., via a virtual machine(s) executing on a physical processing node(s) in a network(s)). As illustrated, in this example, the radio access node 12 includes the control system 16 (optional) that includes the one or more processors 18 (e.g., CPUs, ASICs, FPGAs, and/or the like), the memory 20, and the network interface 22 and the one or more radio units 24 that each includes the one or more transmitters 26 and the one or more receivers 28 coupled to the one or more antennas 30, as described above. The control system 16 is connected to the radio unit(s) 24 via, for example, an optical cable or the like. The control system 16 is connected to one or more processing nodes 32 coupled to or included as part of a network(s) 34 via the network interface 22. Each processing node 32 includes one or more processors 36 (e.g., CPUs, ASICs, FPGAs, and/or the like), memory 38, and a network interface 40.

In this example, functions 42 of the radio access node 12 described herein are implemented at the one or more processing nodes 32 or distributed across the control system 16 and the one or more processing nodes 32 in any desired manner. In some particular embodiments, some or all of the functions 42 of the radio access node 12 described herein are implemented as virtual components executed by one or more virtual machines implemented in a virtual environment(s) hosted by the processing node(s) 32. As will be appreciated by one of ordinary skill in the art, additional signaling or communication between the processing node(s) 32 and the control system 16 is used in order to carry out at least some of the desired functions 42. Notably, in some embodiments, the control system 16 may not be included, in which case the radio unit(s) 24 communicate directly with the processing node(s) 32 via an appropriate network interface(s).

In some embodiments, a computer program including instructions which, when executed by at least one processor, causes the at least one processor to carry out the functionality of a radio access node 12 or a node (e.g., a processing node 32) implementing one or more of the functions 42 of the radio access node 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
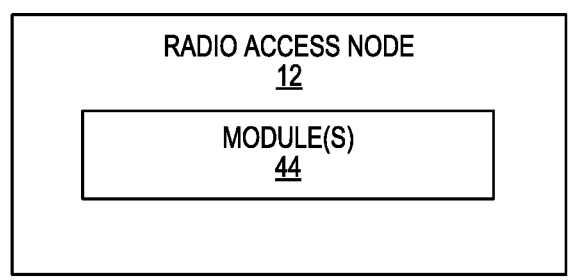

FIG. 20 is a schematic block diagram of the radio access node 12 according to some other embodiments of the present disclosure. The radio access node 12 includes one or more modules 44, each of which is implemented in software. The module(s) 44 provide the functionality of the radio access node 12 described herein. This discussion is equally applicable to the processing node 32 of FIG. 18 where the modules 44 may be implemented at one of the processing nodes 32 or distributed across multiple processing nodes 32 and/or distributed across the processing node(s) 32 and the control system 16.

Figure 21:
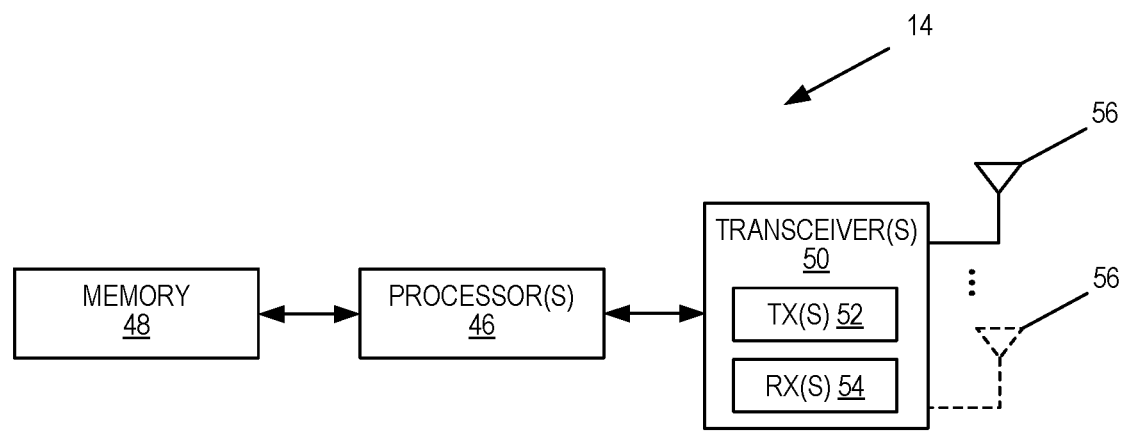
FIGS. 21 and 22 illustrate embodiments of a wireless device.

FIG. 21 is a schematic block diagram of a wireless device 14 according to some embodiments of the present disclosure. As illustrated, the wireless device 14 includes one or more processors 46 (e.g., CPUs, ASICs, FPGAs, and/or the like), memory 48, and one or more transceivers 50 each including one or more transmitters 52 and one or more receivers 54 coupled to one or more antennas 56. In some embodiments, the functionality of the wireless device 14 described above may be fully or partially implemented in software that is, e.g., stored in the memory 48 and executed by the processor(s) 46.

In some embodiments, a computer program including instructions which, when executed by at least one processor, causes the at least one processor to carry out the functionality of the wireless device 14 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
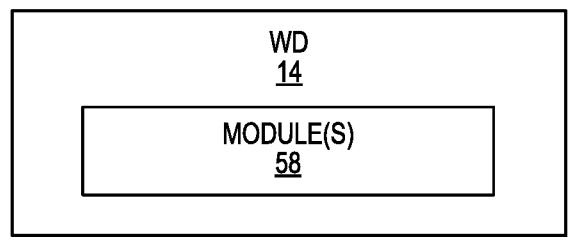

FIG. 22 is a schematic block diagram of the wireless device 14 according to some other embodiments of the present disclosure. The wireless device 14 includes one or more modules 58, each of which is implemented in software. The module(s) 58 provide the functionality of the wireless device 14 described herein.

While not being limited thereto, some example embodiments of the present disclosure are provided below.

Embodiment 1

A method of operation of a wireless device (14) in a cellular communications network (10), comprising: receiving (102) an uplink grant in sTTI n; determining (104), based on a configured uplink/downlink configuration, an uplink scheduling timing l; and transmitting (106), in a sTTI n+l, an uplink transmission in accordance with the uplink grant received in the sTTI n.

Embodiment 2

The method of embodiment 1 wherein the uplink scheduling timing l is a smallest integer number of sTTIs that is larger than or equal to a predefined minimum uplink scheduling timing value such that n+l is an uplink sTTI.

Embodiment 3

The method of embodiments 1 wherein the uplink scheduling timing l is defined based on a load balancing approach in which uplink scheduling grants are equally distributed over different downlink sTTIs.

Embodiment 4

The method of any one of embodiments 1 to 3 wherein the uplink grant schedules multiple uplink sTTIs for the same wireless device (14).

Embodiment 5

The method of embodiment 4 wherein the uplink grant comprises an indication of one or more uplink sTTIs for which the uplink grant is valid.

Embodiment 6

The method of any one of embodiments 1 to 5 wherein an UpPTS can be used for uplink data transmission, and determining (104) the uplink scheduling timing l comprises determining (104) the uplink scheduling timing l in such a manner that the UpPTSs are treated as uplink sTTIs.

Embodiment 7

The method of embodiment 1 or 2 wherein determining the uplink scheduling timing l comprises determining (104) the uplink scheduling timing l based on a predefined table that defines values of l for different values of n for the TDD uplink/downlink configuration.

Embodiment 8

The method of embodiment 7 wherein the predefined table defines the values of l for the different values of n for the TDD uplink/downlink configuration in such a manner that UpPTSs are treated as uplink sTTIs.

Embodiment 9

The method of embodiment 7 wherein the predefined table defines the values of l for the different values of n for the TDD uplink/downlink configuration in such a manner that UpPTSs are not treated as uplink sTTIs.

Embodiment 10

The method of any one of embodiments 7 to 9 wherein the predefined table defines the values of l for the different values of n in accordance with a latency optimization scheme.

Embodiment 11

The method of any one of embodiments 7 to 9 wherein the predefined table defines the values of l for the different values of n in accordance with a load sharing scheme.

Embodiment 12

A wireless device (14) in a cellular communications network (10), the wireless device (14) adapted to: receive an uplink grant in sTTI n; determine, based on a configured uplink/downlink configuration, an uplink scheduling timing l; and transmit, in a sTTI n+l, an uplink transmission in accordance with the uplink grant received in the sTTI n.

Embodiment 13

The wireless device (14) of embodiment 12 wherein the wireless device (14) is further adapted to perform the method of any one of embodiments 2 to 11.

Embodiment 14

A wireless device (14) in a cellular communications network (10), comprising: at least one transceiver (50); at least one processor (46); and memory (48) comprising instructions executable by the at least one processor (46) whereby the wireless device (14) is operable to: receive an uplink grant in sTTI n; determine, based on a configured uplink/downlink configuration, an uplink scheduling timing l; and transmit, in a sTTI n+l, an uplink transmission in accordance with the uplink grant received in the sTTI n.

Embodiment 15

A wireless device (14) in a cellular communications network (10), the wireless device (14) comprising: a receiving module (58) operable to receive an uplink grant in sTTI n; a determining module (58) operable to determine, based on a configured uplink/downlink configuration, an uplink scheduling timing l; and a transmitting module (58) operable to transmit, in a sTTI n+l, an uplink transmission in accordance with the uplink grant received in the sTTI n.

Embodiment 16

A method of operation of a radio access node (12) in a cellular communications network (10), comprising: transmitting (102) an uplink grant to a wireless device (14) in a sTTI n; and receiving (106), in a sTTI n+k, an uplink transmission from the wireless device (14) in accordance with the uplink grant transmitted to the wireless device (14) in the sTTI n.

The following acronyms are used throughout this disclosure.
- 3GPP Third Generation Partnership Project
- 5G Fifth Generation
- ASIC Application Specific Integrated Circuit
- BLER Block Error Rate
- CA Carrier Aggregation
- CN Core Network
- CPU Central Processing Unit
- DCI Downlink Control Information
- DwPTS Downlink Part of a Special Subframe
- eNB Enhanced or Evolved Node B
- FPGA Field Programmable Gate Array
- FS Frame Structure
- GP Guard Period
- HARQ Hybrid Automatic Repeat Request
- HTTP Hypertext Transfer Protocol
- LAA License Assisted Access
- LTE Long Term Evolution
- LSB Least Significant Bit
- MME Mobility Management Entity
- ms Millisecond
- MSB Most Significant Bit
- MTC Machine Type Communication
- OFDM Orthogonal Frequency Division Multiplexing
- PDN Packet Data Network
- P-GW Packet Data Network Gateway
- RAT Radio Access Technology
- SCEF Service Capability Exposure Function
- SC-FDMA Single Carrier Frequency Division Multiple Access
- SF Subframe
- SIB System Information Block
- sPUSCH Short Physical Uplink Shared Channel
- sTTI Short Transmission Time Interval
- TCP Transmission Control Protocol
- TDD Time Division Duplexing
- TS Technical Specification
- TTI Transmission Time Interval
- UE User Equipment
- UI Uplink Index Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network, comprising:
   receiving an uplink grant in short Transmission Transmit Interval (sTTI) n;
   determining, based on a configured uplink/downlink configuration, an uplink scheduling timing l; and
   transmitting, in a sTTI n+l, an uplink transmission in accordance with the uplink grant received in the sTTI n;
   wherein determining the uplink scheduling timing l comprises determining the uplink scheduling timing l based on a predefined table that defines values of l for different values of n for the configured uplink/downlink configuration.

2. The method of claim 1 wherein the uplink scheduling timing l is a smallest integer number of sTTIs that is larger than or equal to a predefined minimum uplink scheduling timing value such that n+l is an uplink sTTI.

3. The method of claim 1 wherein the uplink scheduling timing l is defined based on a load balancing approach in which uplink scheduling grants are equally distributed over different downlink sTTIs.

4. The method of claim 1 wherein the uplink grant schedules multiple uplink sTTIs for the same wireless device.

5. The method of claim 4 wherein the uplink grant comprises an indication of one or more uplink sTTIs for which the uplink grant is valid.

6. The method of claim 1 wherein an uplink part of special subframes can be used for uplink data transmission, and determining the uplink scheduling timing l comprises determining the uplink scheduling timing l in such a manner that the uplink part of the special subframes are treated as uplink sTTIs.

7. The method of claim 1 wherein the predefined table defines the values of l for the different values of n for the configured uplink/downlink configuration in such a manner that an uplink part of special subframes are treated as uplink sTTIs.

8. The method of claim 1 wherein the predefined table defines the values of l for the different values of n for the configured uplink/downlink configuration in such a manner that an uplink part of special subframes are not treated as uplink sTTIs.

9. The method of claim 1 wherein the predefined table defines the values of l for the different values of n in accordance with a latency optimization scheme.

10. The method of claim 1 wherein the predefined table defines the values of l for the different values of n in accordance with a load sharing scheme.

11. The method of claim 1 wherein the sTTI n and the sTTI n+l each have a duration of less than 1 millisecond.

12. The method of claim 1 wherein the sTTI n and the sTTI n+l each have a duration of less than 0.5 milliseconds.

13. A wireless device in a cellular communications network, comprising:
at least one transceiver; at least one processor; and
memory comprising instructions executable by the at least one processor whereby the wireless device is operable to:
receive an uplink grant in short Transmission Time Interval (sTTI) n;
determine, based on a configured uplink/downlink configuration, an uplink scheduling timing l; and
transmit, in a sTTI n+l, an uplink transmission in accordance with the uplink grant received in the sTTI n;
wherein determining the uplink scheduling timing l comprises determining the uplink scheduling timing l based on a predefined table that defines values of l for different values of n for the configured uplink/downlink configuration.

14. A method of operation of a radio access node in a cellular communications network, comprising:
transmitting an uplink grant to a wireless device in a short Transmission Time Interval (sTTI) n; and
receiving, in a short TTI n+l, an uplink transmission from the wireless device in accordance with the uplink grant transmitted to the wireless device in the sTTI n, where l is an uplink scheduling timing U
wherein the uplink scheduling timing l is determined based on a predefined table that defines values of l for different values of n for a Time Division Duplexing, TDD, unlink/downlink configuration.

15. The method of claim 14 wherein the uplink scheduling timing l is a smallest integer number of sTTIs that is larger than or equal to a predefined minimum uplink scheduling timing value such that n+l is an uplink sTTI.

16. The method of claim 14 wherein the uplink scheduling timing l is defined based on a load balancing approach in which uplink scheduling grants are equally distributed over different downlink sTTIs.

17. The method of claim 14 wherein the uplink grant schedules multiple uplink sTTIs for the same wireless device.

18. The method of claim 17 wherein the uplink grant comprises an indication of one or more uplink sTTIs for which the uplink grant is valid.

19. The method of claim 14 wherein an uplink part of special subframes can be used for uplink data transmission, and the uplink scheduling timing l is determined in such a manner that the uplink part of the special subframes are treated as uplink sTTIs.

20. The method of claim 14 wherein the predefined table defines the values of l for the different values of n for the TDD uplink/downlink configuration in such a manner that an uplink part of special subframe are treated as uplink sTTIs.

21. The method of claim 14 wherein the predefined table defines the values of l for the different values of n for the TDD uplink/downlink configuration in such a manner that an uplink part of special subframes are not treated as uplink sTTIs.

22. The method of claim 14 wherein the predefined table defines the values of l for the different values of n in accordance with a latency optimization scheme.

23. The method of claim 14 wherein the predefined table defines the values of l for the different values of n in accordance with a load sharing scheme.

24. The method of claim 14 wherein the sTTI n and the sTTI n+l each have a duration of less than 1 millisecond.

25. The method of claim 14 wherein the sTTI n and the sTTI n+l each have a duration of less than 0.5 milliseconds.

26. A radio access node for a cellular communications network, comprising:
at least one transceiver; at least one processor; and
memory comprising instructions executable by the at least one processor whereby the radio access node is operable to:
transmit an uplink grant to a wireless device in a short Transmission Time Interval (sTTI n); and
receive, in a sTTI n+l, an uplink transmission from the wireless device in accordance with the uplink grant transmitted to the wireless device in the sTTI n, where l is an uplink scheduling timing l;
wherein the uplink scheduling timing l is determined based on a predefined table that defines values of l for different values of n for a Time Division Duplexing, TDD, uplink/downlink configuration.

* * * * *